United States Patent
Sizemore

(10) Patent No.: US 9,841,991 B2
(45) Date of Patent: Dec. 12, 2017

(54) TECHNIQUES FOR VIRTUAL MACHINE MIGRATION

(71) Applicant: NETAPP, INC., Sunnyvale, CA (US)

(72) Inventor: Glenn Sizemore, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/296,695

(22) Filed: Jun. 5, 2014

(65) Prior Publication Data

US 2015/0324227 A1    Nov. 12, 2015

Related U.S. Application Data

(60) Provisional application No. 61/992,108, filed on May 12, 2014.

(51) Int. Cl.
G06F 9/455 (2006.01)
G06F 9/48 (2006.01)

(52) U.S. Cl.
CPC ............ *G06F 9/48* (2013.01); *G06F 9/45558* (2013.01); *G06F 9/4856* (2013.01); *G06F 2009/4557* (2013.01)

(58) Field of Classification Search
None
See application file for complete search history.

(56) References Cited

U.S. PATENT DOCUMENTS

| | | |
|---|---|---|
| 5,710,917 A | 1/1998 | Musa et al. |
| 5,819,292 A | 10/1998 | Hitz et al. |
| 6,131,192 A | 10/2000 | Henry |
| 6,857,001 B2 | 2/2005 | Hitz et al. |
| 7,107,385 B2 | 9/2006 | Rajan et al. |
| 7,409,494 B2 | 8/2008 | Edwards et al. |
| 7,577,722 B1 * | 8/2009 | Khandekar ......... G06F 9/45558 709/220 |
| 7,933,872 B2 * | 4/2011 | Kulkarni ............. G06F 11/1458 707/640 |
| 8,041,888 B2 | 10/2011 | Rajan et al. |
| 8,281,066 B1 | 10/2012 | Trimmer et al. |

(Continued)

OTHER PUBLICATIONS

Microsoft Virtual Hard Disk Image Format Specification 1.0, Oct. 11, 2006, 17 pages.

(Continued)

*Primary Examiner* — Mehran Kamran
(74) *Attorney, Agent, or Firm* — Klein, O'Neill & Singh, LLP

(57) ABSTRACT

Techniques for virtual machine migration are described. An apparatus may comprise a script generation component operative to generate a first script, the first script to migrate a guest operating system running on a first virtual machine to run on a second virtual machine. The first script may be operative to collect configuration information of the guest operating system, generate a second script based on the collected configuration information, and configure the guest operating system to execute the second script, the configuration information collected while the guest operating system is running on the first virtual machine, the guest operating system configured for the execution of the second script to occur while the guest operating system is running on the second virtual machine. Other embodiments are described and claimed.

21 Claims, 14 Drawing Sheets

(56) References Cited

U.S. PATENT DOCUMENTS

| | | | |
|---|---|---|---|
| 8,332,847 B1 | 12/2012 | Hyser et al. | |
| 8,352,608 B1* | 1/2013 | Keagy et al. | 709/226 |
| 8,386,838 B1 | 2/2013 | Byan | |
| 8,417,938 B1* | 4/2013 | Considine | G06F 9/5088 713/151 |
| 8,458,717 B1 | 6/2013 | Keagy et al. | |
| 8,688,636 B1 | 4/2014 | Barve | |
| 8,825,940 B1 | 9/2014 | Diggs | |
| 8,826,033 B1 | 9/2014 | Krishnaprasad et al. | |
| 9,146,769 B1 | 9/2015 | Shankar et al. | |
| 9,177,337 B2* | 11/2015 | Hing | G06Q 30/04 |
| 2005/0216532 A1 | 9/2005 | Lallier | |
| 2006/0089992 A1* | 4/2006 | Blaho | G06F 3/1431 709/227 |
| 2007/0171921 A1 | 7/2007 | Wookey et al. | |
| 2007/0220248 A1* | 9/2007 | Bittlingmayer | G06F 9/44505 713/100 |
| 2008/0235238 A1 | 9/2008 | Jalobeanu et al. | |
| 2008/0263258 A1 | 10/2008 | Allwell et al. | |
| 2009/0172664 A1* | 7/2009 | Mostafa | G06F 9/45504 718/1 |
| 2009/0228629 A1* | 9/2009 | Gebhart | G06F 8/63 711/6 |
| 2010/0070725 A1 | 3/2010 | Prahlad et al. | |
| 2010/0250630 A1 | 9/2010 | Kudo | |
| 2010/0257269 A1 | 10/2010 | Clark | |
| 2010/0281467 A1* | 11/2010 | Arteaga | G06F 11/3684 717/126 |
| 2010/0293349 A1 | 11/2010 | Lionetti et al. | |
| 2011/0022694 A1* | 1/2011 | Dalal | H04L 41/0843 709/222 |
| 2011/0078395 A1* | 3/2011 | Okada | G06F 11/3442 711/162 |
| 2011/0107330 A1 | 5/2011 | Freundlich et al. | |
| 2011/0126269 A1 | 5/2011 | Youngworth | |
| 2011/0131524 A1 | 6/2011 | Chang et al. | |
| 2011/0131576 A1* | 6/2011 | Ikegaya | G06F 9/455 718/1 |
| 2011/0307889 A1* | 12/2011 | Moriki | G06F 9/45558 718/1 |
| 2012/0011193 A1* | 1/2012 | Gilboa | G06F 3/0383 709/203 |
| 2012/0011280 A1* | 1/2012 | Gilboa | G06F 3/0481 709/246 |
| 2012/0011445 A1* | 1/2012 | Gilboa | G06F 3/0481 715/740 |
| 2012/0030669 A1 | 2/2012 | Tsirkin | |
| 2012/0110574 A1 | 5/2012 | Kumar | |
| 2012/0144391 A1 | 6/2012 | Ueda | |
| 2012/0151476 A1* | 6/2012 | Vincent | G06F 9/45558 718/1 |
| 2012/0197772 A1* | 8/2012 | Hing | G06Q 30/04 705/34 |
| 2012/0221699 A1* | 8/2012 | Moriyasu | G06F 9/5077 709/223 |
| 2012/0233282 A1* | 9/2012 | Voccio | G06F 9/45558 709/212 |
| 2012/0278804 A1* | 11/2012 | Narayanasamy et al. | 718/1 |
| 2013/0014102 A1 | 1/2013 | Shah | |
| 2013/0024722 A1 | 1/2013 | Kotagiri et al. | |
| 2013/0139153 A1* | 5/2013 | Shah | G06F 9/45558 718/1 |
| 2013/0139155 A1 | 5/2013 | Shah | |
| 2013/0151802 A1 | 6/2013 | Bahadure et al. | |
| 2013/0152078 A1* | 6/2013 | Arcilla | G06F 9/45558 718/1 |
| 2013/0166504 A1 | 6/2013 | Varkhedi et al. | |
| 2013/0185715 A1* | 7/2013 | Dunning | H04L 41/0803 718/1 |
| 2013/0232474 A1* | 9/2013 | Leclair | G06F 9/44 717/134 |
| 2013/0247136 A1* | 9/2013 | Chieu | G06F 9/5072 726/1 |
| 2013/0275596 A1* | 10/2013 | Subramaniam | 709/226 |
| 2013/0275971 A1* | 10/2013 | Kruglick | G06F 9/5077 718/1 |
| 2013/0326505 A1* | 12/2013 | Shah | G06F 9/45558 718/1 |
| 2013/0339645 A1 | 12/2013 | Barve | |
| 2013/0339956 A1* | 12/2013 | Murase | G06F 9/505 718/1 |
| 2013/0343385 A1 | 12/2013 | Benny et al. | |
| 2014/0007092 A1* | 1/2014 | Barbee | G06F 9/4856 718/1 |
| 2014/0007093 A1* | 1/2014 | Deshpande et al. | 718/1 |
| 2014/0032753 A1* | 1/2014 | Watanabe | H04L 29/08549 709/224 |
| 2014/0075437 A1* | 3/2014 | Mousseau | G06F 8/61 718/1 |
| 2014/0137114 A1* | 5/2014 | Bolte | G06F 9/45533 718/1 |
| 2014/0149983 A1 | 5/2014 | Bonilla et al. | |
| 2014/0165063 A1* | 6/2014 | Shiva | G06F 21/57 718/1 |
| 2014/0172406 A1* | 6/2014 | Baset | G06F 11/3409 703/22 |
| 2014/0196030 A1* | 7/2014 | Deshpande | G06F 9/45558 718/1 |
| 2014/0201732 A1 | 7/2014 | Haag et al. | |
| 2014/0223435 A1* | 8/2014 | Chang | G06F 9/45533 718/1 |
| 2014/0245292 A1* | 8/2014 | Balani | G06F 9/5077 718/1 |
| 2014/0281217 A1 | 9/2014 | Beam et al. | |
| 2014/0282519 A1 | 9/2014 | Apte et al. | |
| 2014/0344807 A1* | 11/2014 | Bursell et al. | 718/1 |
| 2014/0359610 A1* | 12/2014 | Tian | G06F 9/45558 718/1 |
| 2015/0052521 A1* | 2/2015 | Raghu | H04L 63/0272 718/1 |
| 2015/0058382 A1 | 2/2015 | St. Laurent et al. | |
| 2015/0106809 A1* | 4/2015 | Reddy et al. | 718/1 |
| 2015/0109923 A1* | 4/2015 | Hwang | H04L 47/12 370/235 |
| 2015/0113530 A1* | 4/2015 | Arcese | G06F 9/45558 718/1 |
| 2015/0113531 A1* | 4/2015 | Lv | G06F 9/455 718/1 |
| 2015/0134615 A1 | 5/2015 | Goodman et al. | |
| 2015/0140974 A1 | 5/2015 | Liimatainen | |
| 2015/0154039 A1* | 6/2015 | Zada | G06F 9/5011 718/1 |
| 2015/0178113 A1* | 6/2015 | Dake | G06F 9/45558 718/1 |
| 2015/0178128 A1 | 6/2015 | Knowles et al. | |
| 2015/0242225 A1* | 8/2015 | Muller | G06F 9/542 718/1 |
| 2015/0254256 A1 | 9/2015 | St. Laurent et al. | |
| 2015/0324216 A1 | 11/2015 | Sizemore et al. | |
| 2015/0324217 A1* | 11/2015 | Shilmover | G06F 9/45558 718/1 |
| 2016/0019087 A1* | 1/2016 | Hing | G06F 9/45558 718/1 |
| 2016/0070623 A1 | 3/2016 | Derk et al. | |
| 2016/0132400 A1 | 5/2016 | Pawar et al. | |
| 2016/0241573 A1 | 8/2016 | Mixer | |
| 2017/0168903 A1 | 6/2017 | Dornemann et al. | |

OTHER PUBLICATIONS

Non-final Office Action dated Jun. 30, 2016 for U.S. Appl. No. 13/796,010.

Final Office Action dated Mar. 15, 2016 for U.S. Appl. No. 13/796,010.

Non-final Office Action dated Sep. 11, 2015 for U.S. Appl. No. 13/796,010.

Non-final Office Action dated Mar. 10, 2017 for U.S. Appl. No. 14/530,135.

(56) References Cited

OTHER PUBLICATIONS

Final Office Action dated May 4, 2017 for U.S. Appl. No. 14/503,338.
John J., "Top Three Things to Know Before you Migrate to Clustered Data ONTAP," Jul. 23, 2013, 5 pages.
Non-Final Office Action on co-pending (U.S. Appl. No. 14/814,828) dated Jul. 13, 2016.
Notice of Allowance on co-pending (U.S. Appl. No. 14/814,828) dated Feb. 1, 2017.
Non-Final Office Action on co-pending (U.S. Appl. No. 14/712,845) dated Sep. 2, 2016.
Final Office Action on co-pending (U.S. Appl. No. 14/712,845) dated Jan. 26, 2017.
Non-Final Office Action on co-pending (U.S. Appl. No. 14/870,095) dated Oct. 25, 2016.
Notice of Allowance dated Dec. 19, 2016 for U.S. Appl. No. 13/796,010, filed Mar. 12, 2013, 22 pages.
Whitehouse L., et al., "Amazon Web Services: Enabling Cost-Efficient Disaster Recovery Leveraging Cloud Infrastructure", Enterprise Strategy Group, White Paper, Jan. 2012, 16 pages.
Non-final Office Action dated Oct. 6, 2016 for U.S. Appl. No. 14/503,338.
Alvarez., et al., "Back to Basics: FlexClone", Tech on Tap, Apr. 2011, 12 pages.
Bolosky W.J., et al., "Single Instance Storage in Windows 2000," Microsoft Corporation, [retrieved on May 2, 2011], URL: http://citeseerx.ist.psu.edu/viewdoc/download?doi=10.1.1.67.5656&rep=rep1-&type=pdf, Aug. 2000, 12 pages.
Feresten., et al., "Back to Basics: NetApp Thin Provisioning", Tech on Tap, Oct. 2011, 8 pages.
Notice of Allowance on co-pending U.S. Appl. No. 14/530,135 dated Aug. 4, 2017.
Final Office Action on co-pending U.S. Appl. No. 14/870,095 dated Jun. 1, 2017.
Non-Final Office Action on co-pending U.S. Appl. No. 14/928,158 dated Jun. 8, 2017.
Non-Final Office Action on co-pending U.S. Appl. No. 15/140,372 dated Sep. 8, 2017.

\* cited by examiner

1000

Execute a first script in a guest operating system running on a source virtual machine, the first script collecting configuration information of the guest operating system.
*1002*

Generate a second script based on the collected configuration information.
*1004*

Execute the second script in the guest operating system running on a destination virtual machine, the second script reconfiguring the guest operating system to run on the destination virtual machine.
*1006*

*FIG. 10*

TECHNIQUES FOR VIRTUAL MACHINE MIGRATION

RELATED CASES

This application claims the benefit of priority under 35 U.S.C. §119(e) to U.S. Provisional Patent Application No. 61/992,108, titled "Techniques for Virtual Machine Migration," filed on May 12, 2014, which is hereby incorporated by reference in its entirety.

This application is related to U.S. patent application Ser. No. 13/796,010, titled "Technique for Rapidly Converting Between Storage Representations in a Virtualized Computing Environment," filed on Mar. 12, 2013, which is hereby incorporated by reference in its entirety.

BACKGROUND

A virtual machine (VM) is a software implementation of a machine, such as a computer, that executes programs like a physical machine. A VM allows multiple operating systems to co-exist on a same hardware platform in strong isolation from each other, utilize different instruction set architectures, and facilitate high-availability and disaster recovery operations. Migrating data between VM architectures, however, may be problematic. For instance, migration may cause a disruption in services, lengthy migration times, or in some cases lead to data corruption.

BRIEF DESCRIPTION OF THE DRAWINGS

FIG. 10 illustrates an embodiment of a logic flow for the virtual machine migration system of FIG. 1.

DETAILED DESCRIPTION

Figure 1:
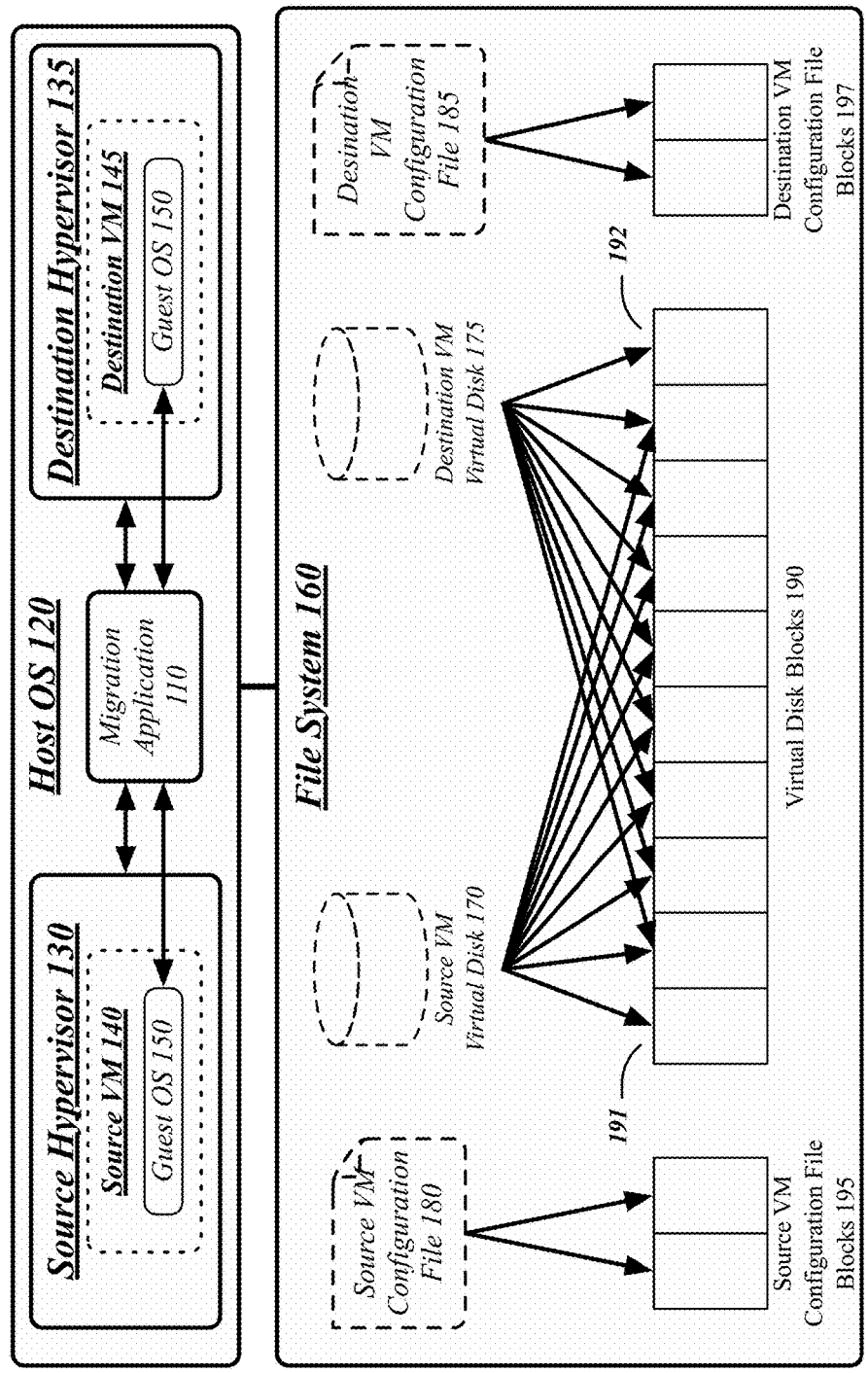
FIG. 1 illustrates an embodiment of a virtual machine migration system.

Various embodiments are generally directed to techniques for virtual machine migration. Some embodiments are particularly directed to techniques for automated virtual machine migration that is either fully-automated or makes use of only minimal human interaction, limited to, for example, bridging physical isolation or logical separation between a virtual machine environment and a control system.

Various embodiments are directed to techniques for virtual machine migration. A guest operating system (OS) runs on top of an execution environment platform known as the virtual machine (VM), which abstracts a hardware platform from the perspective of the guest OS. The abstraction of the hardware platform, the providing of the virtual machine, is performed by a hypervisor, also known as a virtual machine monitor, which runs as a piece of software on a host OS. The host OS typically runs on an actual hardware platform, though multiple tiers of abstraction may be possible. While the actions of the guest OS are performed using the actual hardware platform, access to this platform is mediated by the hypervisor. For instance, virtual network interfaces may be presented to the guest OS that present the actual network interfaces of the base hardware platform through an intermediary software layer. The processes of the guest OS and its guest applications may execute their code directly on the processors of the base hardware platform, but under the management of the hypervisor.

Multiple vendors provide hypervisors for the execution of virtual machines using abstraction technology unique to the vendor's implementation. The vendors use technology selected according to their own development process. However these are frequently different from vendor to vendor. Consequently, the guest OS has tailored virtual hardware and drivers to support the vendor implementation. This variation may lead to a core incompatibility between VM platforms. For example, different VM platforms may use different technologies for bridging to a network, where virtualized network interfaces are presented to the guest OS. Similarly, different VM platforms may use different formats for arranging the data stored in virtual disks onto actual storage hardware. As such, migrating a guest OS from one VM platform to another may require reconfiguration of the guest OS and modification of files stored on the host OS that are referenced by the hypervisor. Performing this reconfiguration and modification may improve the affordability and practicality of transitioning a virtual machine between VM platforms.

It may be of particular value to perform virtual machine migration without the installation of additional software tools, besides those that may be used for integration of the guest OS with the VM platform. For instance, the migration process may include the installation of integration tools, including drivers that provide support for the virtualized hardware devices of the destination VM platform to the guest OS. However, the migration itself may be performed entirely through scripts executed in the guest OS and remote commands from an external migration application, the migration application running on the host OS without virtual machine mediation. Avoiding the installation of migration tools within the guest OS may increase the dependability of the migration process, reduce the footprint of the software used for the migration, and reduce the time used for the migration process, thereby reducing the downtime for the guest OS and any services it may host.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a virtual machine migration system 100. In one embodiment, the virtual machine migration system 100 may comprise a computer-implemented system having a software migration application 110 comprising one or more components. Although the virtual machine migration system 100 shown in FIG. 1 has a limited number of elements in a certain topology, it may be appreciated that the virtual machine migration system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The virtual machine migration system 100 may comprise the migration application 110. The migration application 110 may be generally arranged to migrate guest OS 150 from source VM 140 running on source hypervisor 130 to destination VM 145 running on destination hypervisor 135, wherein each of migration application 110, source hypervisor 130, and destination hypervisor 135 all run on top of host OS 120.

File system 160 may store various files used in the operation of source VM 140 and destination VM 145, and thereby the operation of guest OS 140. File system 160 may store various files used by migration application 110. File system 160 may store various files used by the host OS 120. File system 160 may be provided by host OS 120 or may be a third-party file system working in conjunction by host OS 120. File system 160 may be a local file system, a network-accessible file system, a distributed file system, or use any other file system techniques for the storage of, maintenance of, and access to files.

File system 160 may store source VM configuration file 180 used by source hypervisor 130 for the determination of various configurations of source VM 140. File system 160 may store destination VM configuration file 185 used by destination hypervisor 130 for the determination of various configurations of source VM 140. Source VM configuration file 180 may be composed of one or more source VM configuration file blocks 195. Destination VM configuration file 185 may be composed of one or more destination VM configuration file blocks 197. The configuration of a virtual machine may comprise, among other elements, specifying the configuration of the hardware platform to be virtualized, such as number and type of CPU, memory size, disk size, etc.

Guest OS 150 may be presented a virtual disk by the virtual machines, the virtual disk an abstraction of the physical storage used by the virtual machines. File system 160 may store source VM virtual disk 170, where source VM virtual disk 170 is an arrangement of blocks corresponding to a virtual disk format used by the source hypervisor 130. File system 160 may store destination VM virtual disk 175, where destination VM virtual disk 175 is an arrangement of blocks corresponding to a virtual disk format used by the destination hypervisor 135. Virtual disk blocks 190 is the joint collection of blocks used by both source VM virtual disk 170 and destination VM virtual disk 175. Source VM virtual disk 170 and destination VM virtual disk 175 may be able to be built from almost entirely the same set of blocks, with the common blocks being those that correspond to the storage of data visible to the guest OS 150. Each of the source VM virtual disk 170 and destination VM virtual disk 175 may have one or more blocks dedicated to storage of data and metadata used by the source hypervisor 130 and destination hypervisor 135, respectively, that is not accessible to the guest OS 150. For example, block 191 may be exclusively used by source hypervisor 130 for storing data and metadata used for managing its access to the common blocks of virtual disk blocks 190. Similarly, block 192 may be exclusively used by destination hypervisor 135 for storing data and metadata used for managing its access to the common blocks of virtual disk blocks 190. It will be appreciated that multiple blocks may be used by either or both of source hypervisor 130 and destination hypervisor 135 for the storage of this data and metadata. Because of this overlap in storage blocks transitioning from source hypervisor 130 to destination hypervisor 135 may involve simply creating block 192, with its data and metadata for managing the common blocks, and constructing destination VM virtual disk 175 from those blocks used by source VM virtual disk 170 that are not exclusive to the management data and metadata of source hypervisor 130.

The migration application 110 may interact with the source hypervisor 130, the destination hypervisor 135, the guest OS 150, and the file system 160 to migrate the guest OS 150 from the source hypervisor 130 to the destination hypervisor 135. The migration application 110 may generate one or more scripts that run in the guest OS 150 running on top of each of the source VM 140 and the destination VM 145 to perform the migration. The migration application 110 may use one or more scripts that run in the guest OS 150 on top of the source VM 140 to gather configuration information for use in generation of one or more scripts that run in the guest OS 150 on top of destination VM 145. The migration application 110 may send commands to and monitor the source hypervisor 130 and destination hypervisor 135. For instance, the migration application 110 may script or use direct commands to initiate power cycles of the virtual machines and use the power cycling of virtual machines to monitor the progress of scripts. By using scripts that use the built-in scripting of the guest OS 150 the migration application 110 may avoid installing software agents within the guest OS 150 for performing the migration, thereby simplifying the migration process.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
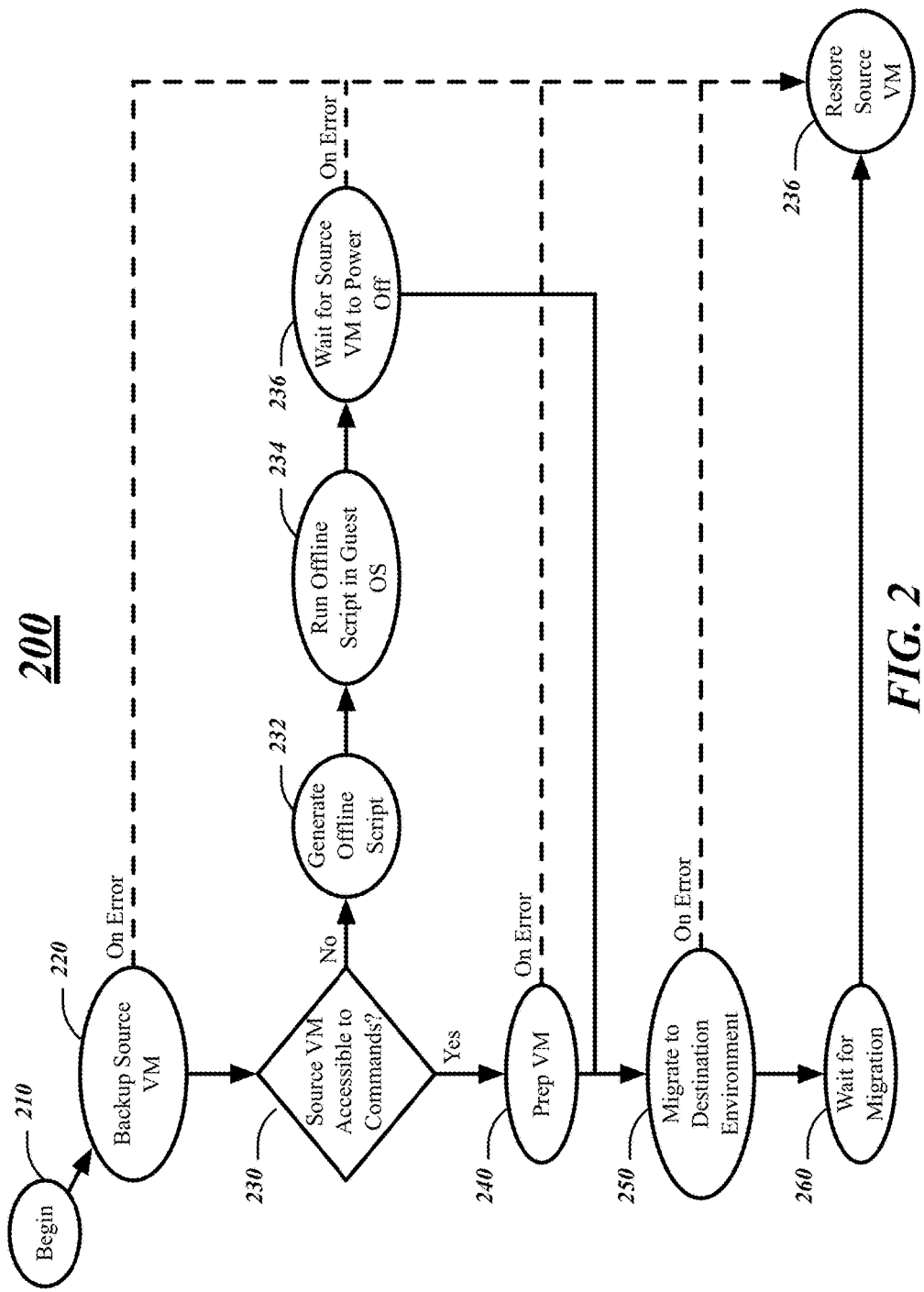
FIG. 2 illustrates an embodiment of an overall logic flow for the virtual machine migration system of FIG. 1.

FIG. 2 illustrates one embodiment of a logic flow 200. The logic flow 200 may be representative of some or all of the operations executed by one or more embodiments described herein. The logic flow 200 may be an overall logic flow for the virtual machine migration system 100, presenting a high-level view of the workflow of the migration process.

In the illustrated embodiment shown in FIG. 2, the logic flow 200 may begin at block 210. This may correspond to the initiation of a virtual machine migration for a particular instantiation of a guest OS. In some cases, the logic flow 200 may be initiated manually be an administrator of a computer system. In others, the logic flow 200 may be initiated programmatically as part of a group of migrations. For example, a plurality of guest OS installations may all be migrated from one hypervisor to another with an automated process automatically migrating each one in turn or in parallel. The logic flow 200 then proceeds to block 220.

The logic flow 200 may back up the source VM 140 at block 220. Errors may occur during the migration process—from bugs, from some unusual element of the VM environment not accounted for in the migration application 110, etc. When this occurs it is beneficial to have the option to restore the source VM 140. If an error occurs during the backup source VM process itself the logic flow 200 may proceed to block 236 where the source VM 140 is attempted to be restored. Otherwise, the logic flow 200 may continue to block 230.

The logic flow 200 may determined whether the source VM 140 is accessible to automated commands at block 230. If the source VM 140 is accessible then the migration application 110 can initiate scripts within the guest OS 150 within the source VM 140, and the logic flow 200 proceeds to box 240. If the source VM 140 is not accessible then the migration application 110 will generate an offline script and hand that script off to a human operator to run in the guest OS 140, and the logic flow 200 proceeds to box 232.

The logic flow 200 may generate an offline script at box 232. This offline script contains all of the work that needs to be done by the migration application 110 in the guest OS 150 in the source VM 140. The logic flow 200 then proceeds to box 234.

The logic flow 200 may run the offline script in the guest OS 150 in the source VM 140 at box 234. While the activity of the offline script is performed programmatically through the scripting application programming interface (API) of the guest OS 150, the transfer of the offline script into the guest OS 150 and the initiation of it are performed by a human operator. The logic flow 200 then proceeds to box 236.

The logic flow 200 may wait for the source VM 140 to power off at box 236. The final operation of the offline script is to power-down the source VM 140—stopping execution of the virtual machine by the physical host. The migration application 110 waits for this powered-off state in order to know that the offline script has completed. If an error occurs the logic flow 200 proceeds to block 236. Otherwise, the logic flow 200 proceeds to block 250.

The logic flow 200 may prepare the source VM 140 at block 240. The preparation of the source VM 140 may generally correspond to the functions of the offline script, but initiated programmatically by the migration application 110 and performed in stages rather than unified into a single offline script. Initiating the script in the guest OS 150 may comprise using a remote administration API of the guest OS 150 or may comprise using a remote administration API of the source hypervisor 130. If an error occurs the logic flow 200 proceeds to block 236. Otherwise, the logic flow 200 proceeds to block 250.

The logic flow 200 may migrate the guest OS 150 to the destination environment provided by the destination hypervisor 135 at block 250. While all of the described steps of logic flow 200 are part of the migration process, box 250 corresponds to the actual transition of configuration information from one environment to another. If an error occurs the logic flow 200 proceeds to block 236. Otherwise, the logic flow 200 proceeds to block 260.

The logic flow 200 may include the migration application 110 waiting for the migration to complete at block 260. As the migration makes use of scripts that run within the guest OS 150 running on the destination VM 145 the migration application 110 may not be able to directly monitor the progress of the scripts and instead depend on the power cycling of the destination VM 145 to monitor whether the scripts have completed. The logic flow 200 then proceeds to box 236.

The logic flow 200 may restore the source VM 140 at block 236. This restoration allows for a return to the original source VM 140 run by the source hypervisor 130 in case, for example, a problem develops with the destination VM 145. With this step complete the migration application 110 may have completed its task or may continue with the migration of other virtual machines.

The embodiments are not limited to this example.

Figure 3:
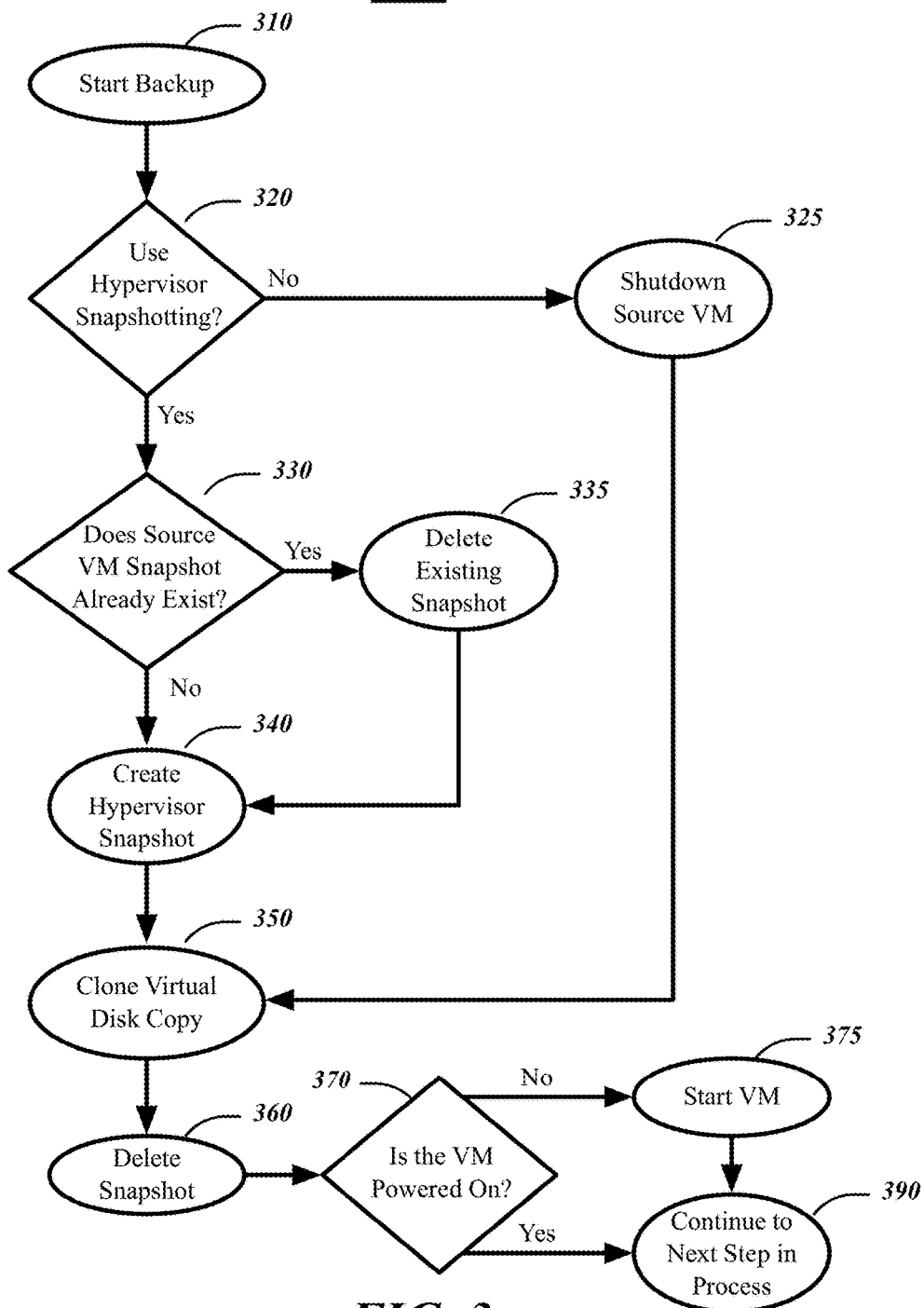
FIG. 3 illustrates an embodiment of a detailed logic flow for the backup stage of the overall logic flow of FIG. 2.

FIG. 3 illustrates one embodiment of a logic flow 300. The logic flow 300 may be representative of some or all of the operations executed by one or more embodiments described herein. The logic flow 300 may be an detailed logic flow for the backup stage of the overall logic flow 200 of FIG. 2.

In the illustrated embodiment shown in FIG. 3, the logic flow 300 may begin at block 310. This may correspond to the transition of the overall logic flow 200 into block 220 of FIG. 2. The logic flow then proceeds to block 320.

The logic flow 300 may determine whether to use hypervisor snapshotting at block 320. This decision may be made as a question of policy (whether the administrator wants to use hypervisor snapshotting) or possibility (whether the hypervisor supports snapshotting). In either case, if hypervisor snapshotting is not to be used the logic flow 300 proceeds to box 325. If hypervisor snapshotting is to be used the logic flow 300 proceeds to box 330.

The logic flow 300 may shutdown the source VM 140 at block 325. This may leave the guest OS 150 in the source VM 140 in a safe state for backing up. The logic flow 300 then proceeds to block 350.

The logic flow 300 may determine whether a source VM snapshot already exists at block 330. For example, a snapshot may have been taken as part of a failed migration attempt with the current instantiation of logic flow 300 a second or later attempt. If one does, the logic flow proceeds to block 335. If not, the logic flow proceeds to block 340.

The logic flow 300 may delete the existing snapshot at block 335 and then proceed to block 340.

The logic flow 300 may create a hypervisor snapshot at block 340. This may comprise sending a command to the source hypervisor 130 instructing it to create the hypervisor snapshot. A hypervisor snapshot may comprise the creation the hypervisor modifying the manner in which it provides source VM virtual disk 170. The hypervisor may, upon taking the snapshot, continue to use the existing virtual disk blocks 190 for when the guest OS 150 reads the source VM virtual disk 170 but create additional blocks, rather than overwriting the existing virtual disk blocks 190, wherever the guest OS 150 (either of its own accord or on behalf of an application it supports) performs a write to the source VM virtual disk 170. These additional blocks may be known as a delta disk, containing the changes to the source VM virtual disk 170 since the creation of the snapshot. As such, the existing virtual disk blocks 190 are maintained in a known safe state while the guest OS 150 continues to operate, preventing downtime for the guest OS 150 and its applications during this state of the migration process. The logic flow 300 then proceeds to block 350.

The logic flow 300 may clone a virtual disk copy at block 350. This may not involve copying all or any of the virtual disk blocks 190 comprising the source VM virtual disk 170. Instead it may involve creating a new file that merely links to the existing blocks, for example via a hard link, instead of duplicating the blocks. This clone may be made from the hypervisor snapshot where one exists. The logic flow 300 then proceeds to block 360.

The logic flow 300 may delete the hypervisor snapshot, if any, at block 360. With the clone of the virtual disk prepared the hypervisor snapshot is no longer of use and can be discarded. With the clone of the virtual disk prepared, the file system 160 will prevent the virtual disk blocks 190 referenced by the clone from being modified, with new blocks being created when the guest OS 150 performs writes. This is similar to the technique used by the source hypervisor 130, but performed by the file system 160 instead of the source hypervisor 130. This clone of the virtual disk is now available for use in restoring the guest OS 150 to a known good state in case of problems with the migration process. The source hypervisor 130 will, from its own perspective, merge the additional blocks it created, the delta disk, back into the virtual disk blocks 180. However, due to the references to these blocks created by the cloned virtual disk, the file system 160 will maintain the distinction between the live-updating source VM virtual disk 170 and the clone created by the migration application 110. The logic flow 300 then proceeds to block 370.

The logic flow 300 may determine whether the source VM 140 is powered on at block 370. The source VM 140 may have been powered off at block 325. If the source VM 140 is not powered on the logic flow 300 proceeds to block 375. Otherwise the logic flow 300 proceeds to block 390.

The logic flow 300 may start the source VM 140 at block 375 and then proceed to bloc 390.

The logic flow 300 may continue to the next step in the overall process at block 390. This may correspond to the transition of the overall logic flow 200 out of block 220 of FIG. 2.

The embodiments are not limited to this example.

Figure 4:
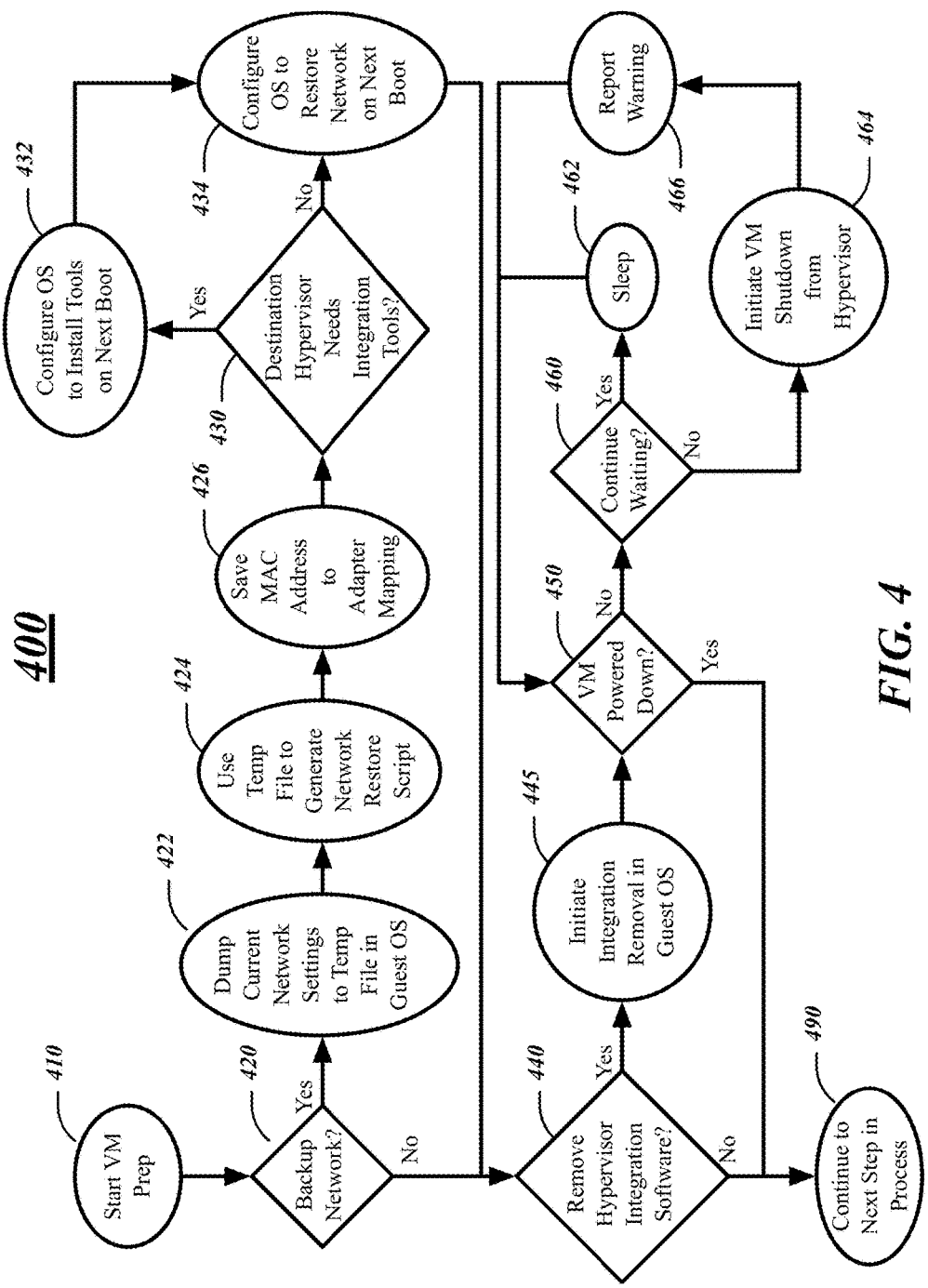
FIG. 4 illustrates an embodiment of a detailed logic flow for the VM prep stage of the overall logic flow of FIG. 2.

FIG. 4 illustrates one embodiment of a logic flow 400. The logic flow 400 may be representative of some or all of the operations executed by one or more embodiments described herein. The logic flow 400 may be an detailed logic flow for the VM prep stage of the overall logic flow 200 of FIG. 2.

In the illustrated embodiment shown in FIG. 4, the logic flow 400 may begin at block 410. This may correspond to the transition of the overall logic flow 200 into block 240 of FIG. 2. The logic flow then proceeds to block 420.

The logic flow 400 may determine whether to backup the network settings at block 420. This may be determined according to configuration of the migration application 110. If the network settings are to be backed up the logic flow 400 proceeds to block 422. Otherwise, the logic flow 400 proceeds to block 440.

The logic flow 400 may dump the current network settings to a temp file in the guest OS 150 at block 422 and then proceed to block 424.

The logic flow 400 may use the temp file to generate a network restore script at block 424. When the guest OS 150 later boots in the destination VM 145 the network restore script may be used there to set up the network for the guest OS 150 in the destination VM 145. The logic flow 400 then proceeds to block 430.

The logic flow 400 may determine whether the destination hypervisor 135 needs integration tools and services at block 430. Some operating systems require integration tools and services in order to function properly within a virtual machine provided by a hypervisor. If integration tools and services are needed then the logic flow 400 proceeds to block 432. Otherwise the logic flow 400 proceeds to block 434.

The logic flow 400 may configure the guest OS 150 to install integration tools and services on the next boot at block 432. The next boot is expected to occur on top the destination VM 145 where the tools and services will be needed. This configuration may comprise setting installation scripts to run on the next boot. The logic flow 400 then proceeds to block 434.

The logic flow 400 may configure the guest OS 150 to restore the network on next boot at block 434. This configuration may comprise setting the network restore script to run on the next boot. The logic flow may then proceed to block 440.

The logic flow 400 may determine whether to remove integration software for the source hypervisor 130 from the guest OS 150 at block 440. In some cases, the administrators of the computing system may desire to keep existing integration tools and services installed in order to allow transition back to the source VM 130. In some cases, transitioning back to the source VM 130 may be motivated by eventual dissatisfaction with the destination VM 145 or may be motivated by the use of software applications on top the guest OS 150 where one or more only work or work better on the source VM 140 and one or more only work or work better on the destination VM 145. Alternatively, the removal of hypervisor integration software may be unnecessary due to hypervisor integration software not being used with the source hypervisor 130. Whatever the reason, if hypervisor integration software is to be removed the logic flow 400 proceeds to block 445. Otherwise, the logic flow 400 proceeds to block 490.

The logic flow 400 may initiate removal of the integration software in the guest OS 150 at block 445. This may be performed by initiating the running of a script within the guest OS 150. This script may conclude with a command to power down the source VM 140 to indicate that the script has completed its task. As this removal occurs after creation of the cloned backup disk, the restoration of the source VM virtual disk 170, if performed, will restore these tools. The logic flow 400 may then proceed to block 450.

The logic flow 400 may check with the source VM 140 has powered down at block 450. If so, the hypervisor tools and services have been successfully removed and the logic flow 400 may proceed to block 490. Otherwise, the logic flow 400 proceeds to block 460.

The logic flow 400 may determine whether to continue waiting for the source VM 140 to power down at block 460. The migration application 110 may have a limit to how long it will wait for the tools to be removed as measured by a watchdog timer. If that limit has not been reached the logic flow 400 may proceed to block 462. If it has been reached the logic flow 400 may proceed to block 464.

The logic flow 400 may have the migration application 110 sleep at block 462. This may consist of a timed period of inactivity—such as may be registered with the host OS 120—to give the source VM 140 more time to power down. The logic flow 400 may then loop back to block 450.

The logic flow 400 may initiate shutdown of the source VM 140 with the source hypervisor 130 at block 464. If the watchdog timer has expired the migration application 110 has reached the point where it is no longer willing to wait for the guest OS 150 to shut down the source VM 140 on the basis of the integration software removal script. As such, the migration application 110 directly commands the source hypervisor 130 to stop the source VM 140. The logic flow 400 then proceeds to block 466.

The logic flow 400 may report a warning at block 466. Having forced the source VM 140 to power down from the hypervisor may leave the guest OS 150 in a unclean or otherwise problematic state. This warning reports to an administrator of the migration application 110 of this possibility. The logic flow may then proceed back to block 450 to check for the source hypervisor 130 having powered down the source VM 140.

The logic flow 400 may continue to the next step in the overall process at block 490. This may correspond to the transition of the overall logic flow 200 out of block 240 of FIG. 2.

The embodiments are not limited to this example.

Figure 5:
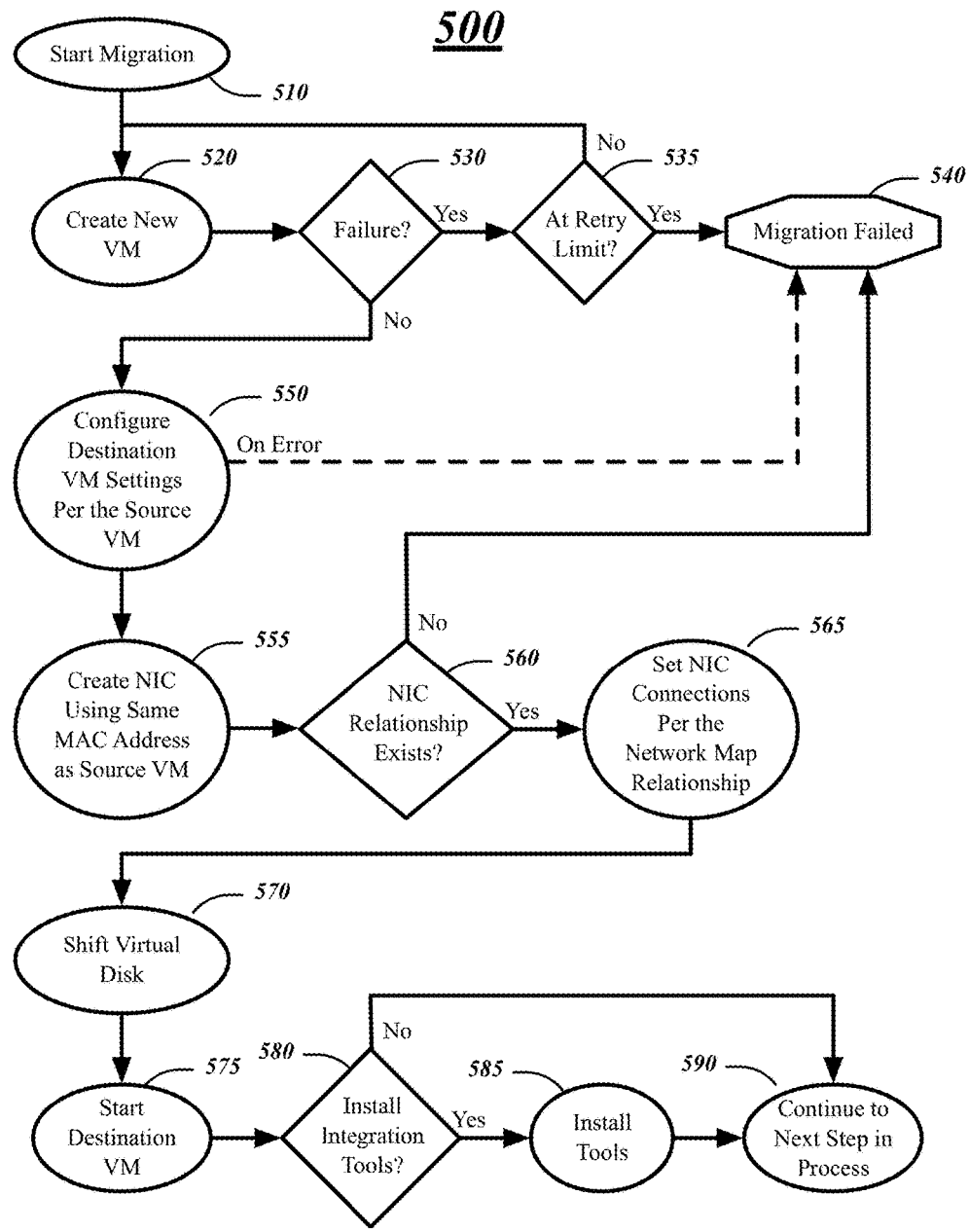
FIG. 5 illustrates an embodiment of a detailed logic flow for the migration stage of the overall logic flow of FIG. 2.

FIG. 5 illustrates one embodiment of a logic flow 500. The logic flow 500 may be representative of some or all of the operations executed by one or more embodiments described herein. The logic flow 500 may be an detailed logic flow for the migration stage of the overall logic flow 200 of FIG. 2.

In the illustrated embodiment shown in FIG. 5, the logic flow 500 may begin at block 510. This may correspond to the transition of the overall logic flow 200 into block 250 of FIG. 2. The logic flow then proceeds to block 520.

The logic flow 500 may create a new virtual machine, the destination VM 145, at block 520. This may be created on the same physical hardware as the source VM 140 or at new physical hardware. The logic flow 500 then proceeds to block 530.

The logic flow 500 may determine whether the creation of destination VM 145 has failed at block 530. In some cases errors may occur in the VM-creation process and the process may have to be attempted multiple times. If the VM creation failed then the logic flow 500 proceeds to block 535. Otherwise, the logic flow 500 proceeds to block 550.

The logic flow 500 may determine whether the migration application 110 has reached its retry limit at block 535. The migration application 110 may be configured to only attempt VM creation a limited number of times in order to forestall a potentially infinite loop. If it is at the retry limit, the logic flow 500 may then proceed to block 540. If the retry limit has not been reached then the logic flow 500 may loop back to block 520 and re-attempt the creation of destination VM 145.

The logic flow 500 may determine that migration has failed at block 540. With the VM creation retry limit reached, or configuration of the destination VM 145 having failed, the migration is not successful. The migration application 110 may indicate this failure to an administrator of the application. The migration application 110 may proceed to restore the source VM 140, as following the "on error" path from block 250 of FIG. 2.

The logic flow 500 may configure the destination VM 145 settings per the source VM 140 settings at block 550. For example, the destination VM 145 may be configured to have the same number of CPUs, same amount of RAM, and other virtualized hardware configurations as with the source VM 140 so as to provide as much continuity of virtualized hardware platform as possible to the guest OS 150. If an error occurs during this process the logic flow 500 may proceed to block 540. If this process completes successfully the logic flow 500 may proceed to block 555.

The logic flow 500 may create one or more network interface controllers (NICs) in the destination VM 145 using the same media access control (MAC) addresses as in the source VM 140 at block 555. These NICs are virtualized network adaptors used by the destination hypervisor 135 to bridge real network interfaces to the guest OS 150 when running on the destination VM 145. By configuring the destination VM 145 with the same MAC addresses as used with the source VM 140 the guest OS 150 will be able to be configured by scripts running within the guest OS 150 to match up internal network connections for the OS with the virtualized network adaptors. If new MAC addresses were assigned then the scripts may be unable to determine which NIC should be connected with which internal connections for the guest OS 150 as programs running within the guest OS 150 don't have visibility to the actual network configuration of the host OS 120. The logic flow 500 then proceeds to block 560.

The logic flow 500 determines whether it has access to a NIC relationship map at block 560. The NIC relationship map is a simple one for one relational link between the various host operating systems, which may be used where a different host operating system is used for the source VM 140 and the destination VM 145. Since each hypervisor employs a specialized network implementation it is valuable to maintain a key. If an appropriate map is found then the destination VM NIC is connected to the appropriate network on the destination host OS. If it does not, it cannot configure the network and the logic flow 500 proceeds to block 540. If it does, the logic flow 500 proceeds to block 565.

The logic flow 500 sets NIC connections per the network map relationship at block 565. Connections between the guest OS 150 are configured to the virtualized NICs based on the preconfigured relational mapping. The network connections of the guest OS 150 are rebuilt such that each internal connection connects to the virtualized NIC with the same MAC address as that internal connection was connected to when the guest OS 150 was in the source VM 140. The logic flow 500 then proceeds to block 570.

The logic flow 500 may shift the virtual disk at block 570. This may correspond to the creation of the destination VM virtual disk 175 through the creation of one or more new header, footer, or other metadata blocks for the virtual disk blocks 190 of the source VM virtual disk 170. The logic flow 500 then proceeds to block 575.

The logic flow 500 may start the destination VM 145 at block 575. This may comprise sending a power-on command to the destination hypervisor 135. The logic flow 500 then proceeds to block 580.

The logic flow 500 may determine whether to install integration tools and services at block 580. This determination may be an inherent consequence of whether the guest OS 150 was configured to automatically install integration tools and services for the destination hypervisor 135 at its next boot at block 432 of FIG. 4. If this boot configuration was performed, the logic flow 500 proceeds to block 585. Otherwise, the logic flow 500 proceeds to block 590.

The logic flow 500 may install integration tool and services in the guest OS 150 at block 585. This may be performed automatically by scripts initiated at boot by the guest OS 150. The logic flow 500 then proceeds to block 590.

The logic flow 500 may continue to the next step in the overall process at block 590. This may correspond to the transition of the overall logic flow 200 out of block 250 of FIG. 2.

The embodiments are not limited to this example.

Figure 6:
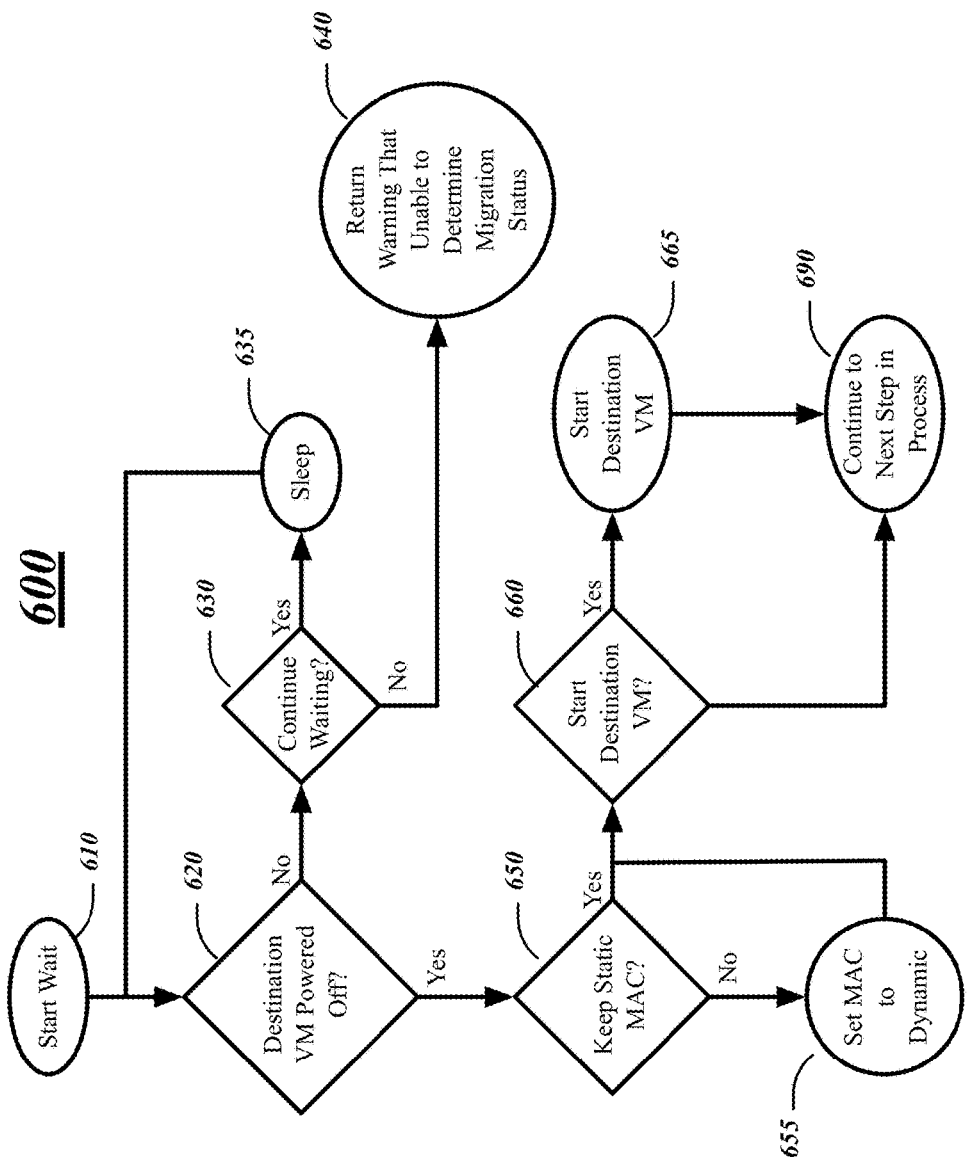
FIG. 6 illustrates an embodiment of a detailed logic flow for the wait stage of the overall logic flow of FIG. 2.

FIG. 6 illustrates one embodiment of a logic flow 600. The logic flow 600 may be representative of some or all of the operations executed by one or more embodiments described herein. The logic flow 600 may be an detailed logic flow for the wait stage of the overall logic flow 200 of FIG. 2.

In the illustrated embodiment shown in FIG. 6, the logic flow 600 may begin at block 610. This may correspond to the transition of the overall logic flow 200 into block 260 of FIG. 2. The logic flow then proceeds to block 620.

The logic flow 600 may determine whether the destination VM 145 has powered off at block 620. The one or more scripts configured to be automatically initiated at the boot of guest OS 150 may conclude with a command to the guest OS 150 to power off. As the migration application 110 may not have visibility into the internal operation of the guest OS 150 it may use power state transitions to monitor the progress of the scripts. If the destination VM 145 has powered off, the logic flow 600 proceeds to block 650. Otherwise, the logic flow 600 proceeds to block 630.

The logic flow 600 may determine whether to continue waiting for the destination VM 145 to power down at block 630. The migration application 110 may have a limit to how long it will wait for the scripts initiated at the boot of the guest OS 140 to complete as measured by a watchdog timer. If that limit has not been reached the logic flow 600 may proceed to block 635. If it has been reached the logic flow 600 may proceed to block 640.

The logic flow 600 may have the migration application 110 sleep at block 635. This may consist of a timed period of inactivity—such as may be registered with the host OS 120—to give the destination VM 145 more time to power down. The logic flow 600 may then loop back to block 620.

The logic flow 600 may return a warning that the migration application 110 is unable to determine migration status of the guest OS 150 at block 640. The migration application 110 may proceed to restore the source VM 140 as with proceeding to block 250 of FIG. 2 or may allow an administrator to determine how to proceed as an administrator may be able to, for example, view into the operation of guest OS 150 and determine that more time should or should not be allowed for the scripts to complete.

The logic flow 600 may determine whether to keep a static MAC at block 650. The schemes used by the source hypervisor 130 and destination hypervisor 135 may differ as to how they create MAC addresses for virtualized NICs. Maintaining MAC addresses generated by the source hypervisor 130 may result in eventual problems as the source hypervisor 130 may decide that, having lost control of guest OS 150 that the MAC address the source hypervisor 130 assigned to the source VM 140 for use by guest OS 150 are available again and assign those MAC addresses to a new VM. These problems may be avoided by allowing the destination hypervisor 135 to assign new MAC addresses to the virtualized NICs. Alternatively, some virtual machines may be, for example, recreations of real hardware so as to smoothly transition an operating system from running on real hardware to running on virtualized hardware. In these cases the MAC addresses may be guaranteed to remain unique and, as such, not need to be set to be assigned by the destination hypervisor 135. This may be of particular importance, even where the MAC addresses did not originally correspond to real hardware, where the applications running on the guest OS 150 make use of a static MAC address. If static MACs are to be kept the logic flow 600 proceeds to block 660. Otherwise, the logic flow 600 proceeds to block 655.

The logic flow 600 may set MAC addresses to dynamic assignment by the destination hypervisor 135 at block 655. The logic flow 600 then proceeds to block 660.

The logic flow 600 may determine whether to start the destination VM 145 at block 660. This may be a configuration option of the migration application 110. For example, an administrator may have decided to perform a test migration to confirm that the migration process may be performed without error, without an interest in bringing the destination VM 145 online at that time. If the destination VM 145 is to be started, the logic flow 600 proceeds to block 665. Otherwise, the logic flow 600 proceeds to block 690.

The logic flow 600 may start the destination VM 145 at block 665. This may comprise the migration application 110 sending a power-on command to the destination hypervisor 135. The logic flow 600 then proceeds to block 690.

The logic flow 600 may continue to the next step in the overall process at block 690. This may correspond to the transition of the overall logic flow 200 out of block 260 of FIG. 2.

The embodiments are not limited to this example.

Figure 7:
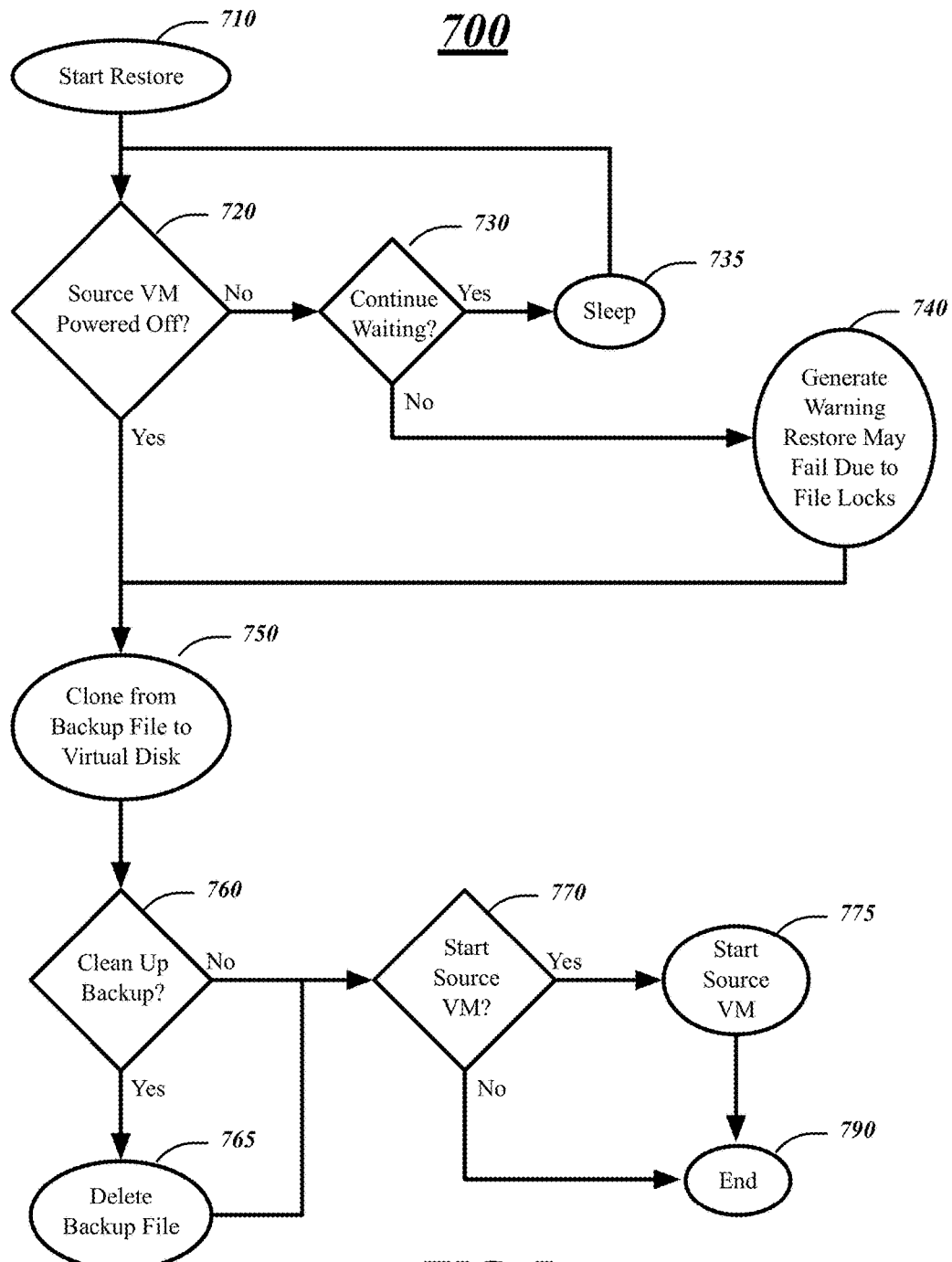
FIG. 7 illustrates an embodiment of a detailed logic flow for the restore stage of the overall logic flow of FIG. 2.

FIG. 7 illustrates one embodiment of a logic flow 700. The logic flow 700 may be representative of some or all of the operations executed by one or more embodiments described herein. The logic flow 700 may be an detailed logic flow for the restore stage of the overall logic flow 200 of FIG. 2.

In the illustrated embodiment shown in FIG. 7, the logic flow 700 may begin at block 710. This may correspond to the transition of the overall logic flow 200 into block 236 of FIG. 2. The logic flow then proceeds to block 720.

The logic flow 700 may determine whether the source VM 140 has powered off at block 720. If the source VM 140 has powered off, the logic flow 700 proceeds to block 750. Otherwise, the logic flow 700 proceeds to block 730.

The logic flow 700 may determine whether to continue waiting for the source VM 140 to power down at block 730. If the migration application 110 is willing to continue waiting the logic flow 700 may proceed to block 735. If the limit of its willingness to wait has been reached the logic flow 700 may proceed to block 740.

The logic flow 700 may have the migration application 110 sleep at block 735. This may consist of a timed period of inactivity—such as may be registered with the host OS 120—to give the source VM 140 more time to power down. The logic flow 700 may then loop back to block 720.

The logic flow 700 may return a warning that the restore may fail due to file locks at block 740. The failure of the source VM 720 to shut down may result in some of the files used by the source hypervisor 130 in generation the source VM 140 to still be locked and thereby interfere with the restoration of the source VM 140. The logic flow 700 may then continue to block 750.

The logic flow 700 may clone from the backup file to the virtual disk to restore the source VM virtual disk 170. The logic flow 700 then proceeds to block 760.

The logic flow 700 may determine whether to clean up the backup file at block 760. This may be a configuration option of the migration application 110. Some administrators may choose to keep around the backup file in order to, for example, have a known good configuration of the source VM 140 during testing of the destination hypervisor 135. If clean up is to be performed the logic flow 700 proceeds to block 765. Otherwise, the logic flow 700 proceeds to block 770.

The logic flow 700 may delete the backup file at block 765. This may not result in the removal of any actual blocks from the file system 160 but instead simply the decrementing of a file reference counter on any of the virtual disk blocks 190 referenced by the backup file. The logic flow 700 may then proceed to block 770.

The logic flow 700 may determine whether to start the source VM 140 at block 770. This may be a configuration option of the migration application 110. For example, if the migration was a test migration, the destination VM 145 may not have been started at the decision point of block 660 in FIG. 6 and instead the source VM 140 is restarted in order to resume operation of the guest OS 150 on top of source VM 140 provided by source hypervisor 130. If the source VM 140 is to be started again the logic flow 700 proceeds to block 775.

The logic flow 700 may start the source VM 140 at block 775. This may be performed by the migration application 110 sending a power-on command to the source hypervisor 130. The logic flow 700 then proceeds to block 790.

The logic flow 700 may end at block 790. This may correspond to the transition of the overall logic flow 200 out of block 236 of FIG. 2. As discussed with reference to block 236 of FIG. 2, this may indicate that the migration application 110 has completed its task or may result in the migration application 110 continuing with the migration of other virtual machines.

The embodiments are not limited to this example.

Figure 8:
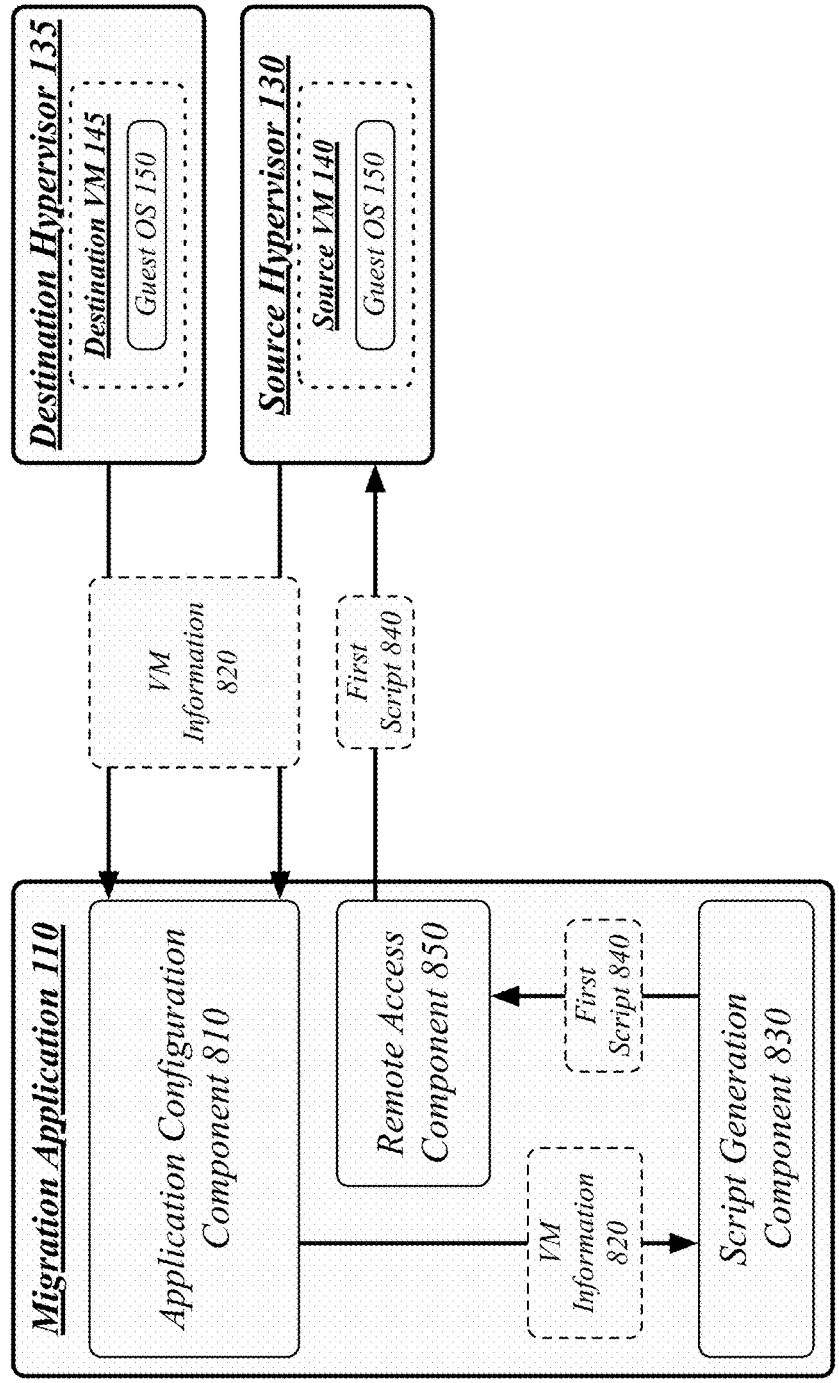
FIG. 8 illustrates a second embodiment of a virtual machine migration system.

FIG. 8 illustrates a second block diagram for the virtual machine migration system 100. In one embodiment, the virtual machine migration system 100 may comprise a computer-implemented system having a migration application 110 comprising one or more components. Although the virtual machine migration system 100 shown in FIG. 8 has a limited number of elements in a certain topology, it may be appreciated that the virtual machine migration system 100 may include more or less elements in alternate topologies as desired for a given implementation.

The system 100 may comprise the migration application 110. The migration application 110 may be generally arranged to oversee the deployment of one or more scripts to a guest OS 150 to migrate the guest OS 150 from a source VM 140 provided by a source hypervisor 130 to a destination VM 145 provided by a destination hypervisor 135. The migration application 110 may comprise an application configuration component 810, script generation component 830, and a remote access component 850.

The application configuration component 810 may be generally arranged to request VM information 820 from the source hypervisor 130 and destination hypervisor 135. This may comprise use an API for the hypervisors 130, 135 to retrieve information relevant to the generation of scripts specific to the source hypervisor 130, destination hypervisor 135, the source VM 140, destination VM 145, and guest OS 150. The application configuration component 810 may receive the VM information 820 from the source hypervisor 130 and destination hypervisor 135 and pass the VM information 820 to the script generation component 830.

In some embodiments, the collecting of information about some or all of the source hypervisor 130, destination hypervisor 135, the source VM 140, destination VM 145, and guest OS 150 may be irrelevant to the generation of the migration scripts. As such, the application configuration component 810 may only collect such information as relevant to that embodiment. In some embodiments, the migration scripts may be generated without the VM information 820 being collected from the hypervisors 130, 135. In these embodiments, the particular hypervisors 130, 135 and guest OS 150 being used—for example, a product name for the hypervisors 130, 135 and guest OS 150—may be specified during a configuration of migration application 110 by an administrator of the virtual machine migration system 100.

The script generation component 830 may be generally arranged to generate a first script 840, the first script 840 to migrate a guest OS 150 running on a source VM 140 to run on a destination VM 145. The source VM 140 may be provided by a source hypervisor 130 and the destination VM 145 may be provided by a destination hypervisor 135. The source hypervisor 130 and the destination hypervisor 135 may differ in hardware virtualization as to prevent the guest OS 150 from making full use of the destination VM 145 without reconfiguration. For instance, the guest OS 150 may be able to boot and run scripts on the destination VM 145 without reconfiguration, but be unable to access any or all of one or more networks provided by the destination VM 145 without reconfiguration by the virtual machine migration system 100. In general, the guest OS 150 being prevented from making full use of the destination VM 145 without reconfiguration may correspond to the guest OS 150 making use of one or more virtualized hardware resources of the source VM 140 that it is unable to make use of on the destination VM 145 without reconfiguration.

In some cases, the first script 840 may have its execution within the guest OS 150 initiated by the remote access component 850. In these cases, the first script 840 may be part of a plurality of scripts, wherein all of the plurality of scripts are executed within the guest OS 150. Each of the plurality of scripts may be associated with a particular area of reconfiguration, such as network reconfiguration, tools reconfiguration, etc. However, in some cases, the guest OS 150 may not be accessible to automated commands by the migration application 110. In these cases, the script generation component 830 may generate the first script 840 as an offline script operative for human-initiated execution. The first script 840 may be generated as an offline script in response to the remote access component 850 determining that source VM 140 is inaccessible to automated commands. The offline script may contain all of the scripted activities that would otherwise be performed by the plurality of scripts into a single script, to ease the process for the human operator manually loading it into the guest OS 150 and initiating it.

The script generation component 830 may generate the first script 840 using templates configured into the migration application 110. For instance, the migration application 110 may store script elements for the performance of various migration tasks, which may be specific to any individual or combination of particular tasks, particular guest operating systems, particular source hypervisors, particular destination hypervisors, and particular options selected by an administrator of the virtual machine migration system 100. The script element may include templates variables for which values may be assigned based on any individual or combination of particular tasks, particular guest operating systems, particular source hypervisors, particular destination hypervisors, and particular options selected by an administrator of the virtual machine migration system 100. In general, any known technique for generating a script, including any known technique for generating scripts based on templates, may be used.

The remote access component 850 may be generally arranged to command the guest OS 150 to execute the first script 840 using at least one of a remote access API of the guest OS 150 or a remote administration API of a source hypervisor 130 for the source VM 140. A remote access API of the guest OS 150 may be provided by the guest OS 150 for remote administration of the guest OS 150. A remote administration API of a source hypervisor 130 may be provided by the source hypervisor 130 for remote access to the guest OS 150 by providing a bridge between the environment external to the source VM 140 and the guest OS 150 within it.

Where neither such API exists, or, alternatively, where a particular API relied on by an embodiment of the virtual machine migration system 100 does not exist, the remote access component 850 may be operative to determine that that the source VM 140 is inaccessible to automated commands and report such to the script generation component 830 so as to indicate that an offline script should be generated. In other cases, the use of an offline script may be specified by an administrator of the virtual machine migration system 100, with the script generation component 830 producing the first script 840 as an offline script in response to the specification by the administrator rather than in response to a determination by the remote access component 850 that the source VM 140 is inaccessible to automated commands. Such configuration by the administrator may be performed even where the source VM 140 would be accessible to automated commands.

Figure 9:
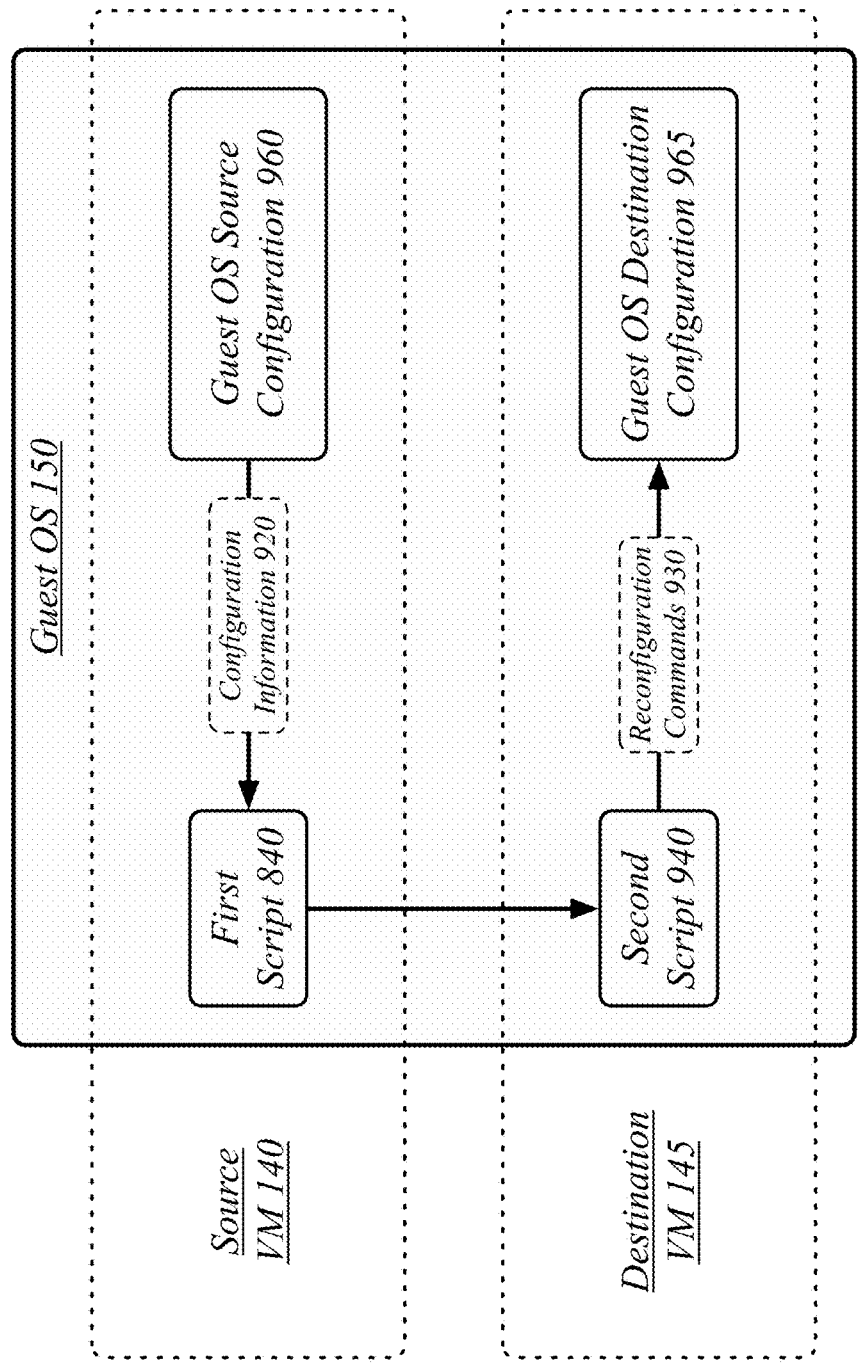
FIG. 9 illustrates an embodiment of a first and second script executing in the guest operating system for the virtual machine migration system.

FIG. 9 illustrates an embodiment of a first script 840 and second script 940 executing in the guest OS 150 for the virtual machine migration system 100.

The first script 840 may be generally arranged to collect configuration information 920 of the guest OS 150 based on the current guest OS source configuration 960 while the guest OS 150 is running on the source VM 140. The first script 840 may collect the configuration information 920 by querying the guest OS 150, utilities of the guest OS 150, and configuration files of the guest OS 150.

The first script 840 may generate a second script 940 based on the collected configuration information 960. The first script 840 may generate the second script 940 using templates configured into the first script 840. For instance, the migration application 110 may store script elements for the performance of various migration tasks, which may be specific to any individual or combination of particular tasks, particular guest operating systems, particular source hypervisors, particular destination hypervisors, and particular options selected by an administrator of the virtual machine migration system 100. The script element may include templates variables for which values may be assigned based on any individual or combination of particular tasks, particular guest operating systems, particular source hypervisors, particular destination hypervisors, and particular options selected by an administrator of the virtual machine migration system 100. In general, any known technique for generating a script, including any known technique for generating scripts based on templates, may be used. The script elements relevant to the current migration may be made available to the first script 840 by the script generation component 830, which may include providing multiple potential elements that may be selected from by the first script 840 according to the collected configuration information 920.

The configuration information 920 may be collected while the guest OS 150 is running on the source VM 140. Collecting the configuration information 920 while the guest OS 150 is still running on the source VM 140 allows the collected configuration information 920 to be read from the guest OS source configuration 960 while it is operating correctly within the virtualized hardware environment provided by the source hypervisor 130.

The first script 840 may configure the guest OS 150 to execute the second script 940. The guest OS 150 may be configured for the execution of the second script 840 to occur while the guest OS 150 is running on the destination VM 145. As the second script 840 will be reconfiguring the guest OS 150 to properly run on the destination VM 145, this reconfiguration occurs while the guest OS 150 is running on virtualized hardware environment provided by the destination hypervisor 135. Because the virtualized hardware environment provided by the destination hypervisor 135 may differ from the virtualized hardware environment provided by the source hypervisor 130, the reconfiguration is best performed with access to the changes in environment presented by the new virtualized hardware environment of the destination VM 145 as the reconfiguration may be specific to the destination VM 145. The second script 940 may reconfigure the guest OS 150 using scripting-based reconfiguration commands 930 to create the guest OS destination configuration 965. The reconfiguration commands 930 may be encoded in the second script 940 by the first script 840 based on the configuration information 920. In some embodiments, the second script 940 may be part of a plurality of scripts generated by the first script 840, wherein the plurality of scripts are executed within the guest OS 150 running on top of the destination VM 145 based on the first script 840 configuring the guest OS 150 to execute them.

The first script 840 may configure the guest OS 150 to execute the second script 940 on a next booting up of the guest OS 150. The first script 840 may perform this configuration while the guest OS 150 is running on the source VM 140, after the configuration information 920 has been collected and the second script 940 generated. The first script 840 may then shut down the guest OS 150.

The remote access component 850 may monitor the source hypervisor 130 to determine when the guest OS 150 has shut down and, accordingly, the source VM 140 has moved to a virtualized power-off state. The remote access component 850 may monitor the source hypervisor 130 for the guest OS 150 shutting down in order to determine when the first script 840 has completed its tasks and has made the guest OS 150 ready to boot on top the destination VM 145. As such, when the remote access component 850 determines that the guest OS 150 has shut down on the source VM 140 it may then command the destination hypervisor 125 to boot up the guest OS 150 on the destination VM 145 in response.

In some cases, the guest OS 150 may fail to shut down when running on the source VM 140. As such, the migration application 110 may have a limited amount of time it is willing to wait for the first script 840 to complete. When this time has expired the remote access component 850 may instruct the source hypervisor 130 to force the shut down of the guest OS 150 by forcing the source VM 140 into a virtualized power-off state. While this risks leaving the guest OS 150 in an unsafe state, it may be preferable to allowing the guest OS 150 to indefinitely hang without shutting down. The migration application 110 may be configured to wait an amount of time estimated to be a sufficient amount of time for the first script 840 to collect the configuration information 920 and generate the second script 940. Once the guest OS 150 has been forced to shut down, the remote access component 850 may command the destination hypervisor 135 to boot up the guest OS 150 on top of the destination VM 145 in response.

In some cases, the configuration information 920 collected may include a mapping between one or more network interfaces of the source VM 140 and media access control (MAC) addresses assigned to the one or more network interfaces of the source VM 140. The second script 940 may reconfigure the guest OS 150 by creating associations between the guest OS 150 and one or more network interfaces of the destination VM 145 based on the mapping generated by the first script 840. The associations created by be based on the mapping by virtue of the second script 940 having been created by the first script 840 using the mapping in order to reproduce the association between internal network interfaces of the guest OS 150 and the MAC addresses to which they were assigned in the destination VM 145 as they were in the source VM 140. This may serve to resolve any networking complications created by using different technologies for virtualizing a network interface or using a different naming scheme for the virtualized network interfaces.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may . . . at block 1002.

The logic flow 1000 may execute a first script 840 in a guest OS 150 running on a source VM 140, the first script 840 collecting configuration information 920 of the guest OS 150 at block 1004. The first script 840 may be executed in the guest OS 150 using at least one of a remote access API of the guest OS 150 or a remote administration API of a source hypervisor 130 for the source VM 140. Alternatively, it may be determined that the source VM 140 is inaccessible to automated commands, with the first script 84 generated as an offline script operative for human-initiated execution in response.

The source VM 140 may be provided by a source hypervisor 130, the destination VM 145 provided by a destination hypervisor 135, the source hypervisor 130 and destination hypervisor 135 differing in hardware virtualization as to prevent the guest OS 150 from making full use of the destination VM 135 without reconfiguration. In particular, the networking configuration of the guest OS 150 may be incompatible with the virtualized networking hardware presented to the guest OS 150 as part of the virtualized hardware environment of the destination VM 145.

The configuration information 920 collected may comprise a NIC-to-MAC mapping between one or more network interfaces of the source VM 140 and media access control addresses assigned to the one or more network interfaces of the source VM 140. This mapping may allow the logic flow 1000 to recreate the associations between non-virtualized, physical NICs and the virtualized NICs of the virtualized hardware environment despite changes in how the virtualized hardware environment is created.

The logic flow 1000 may generate a second script 940 based on the collected configuration information 920 at block 1006. This second script 940 may be generated by the first script 840.

The logic flow 1000 may execute the second script 940 in the guest OS 150 running on the destination VM 145, the second script 940 reconfiguring the guest OS 150 to run on the destination VM 145 at block 1008. The second script 940 may be executed by the first script 840 configuring the guest OS 150 while its running on the source VM 140 to automatically execute the second script 940 on a next booting up of the guest operating system. The first script 840 may then shut down the guest OS 150. The guest OS 150 may be booted up on the destination VM 145 after being shut down.

The first script 840 may configure the guest OS 150 to immediate boot after the shut down (e.g., a reboot), or may allow an external migration application 110 running without virtual machine mediation on the host OS 120 to boot the guest OS 150. This migration application 110 may act to have the next boot be on the destination VM 145 provided by the destination hypervisor 135 and may perform other tasks between the shut down of the guest OS 150 and its next boot to further the migration of the guest OS 150.

The second script 94 may reconfigure the guest OS 150 by creating associations between the guest OS 150 and one or more network interfaces of the destination VM 135 based on the NIC-to-MAC mapping.

The embodiments are not limited to this example.

Figure 11:
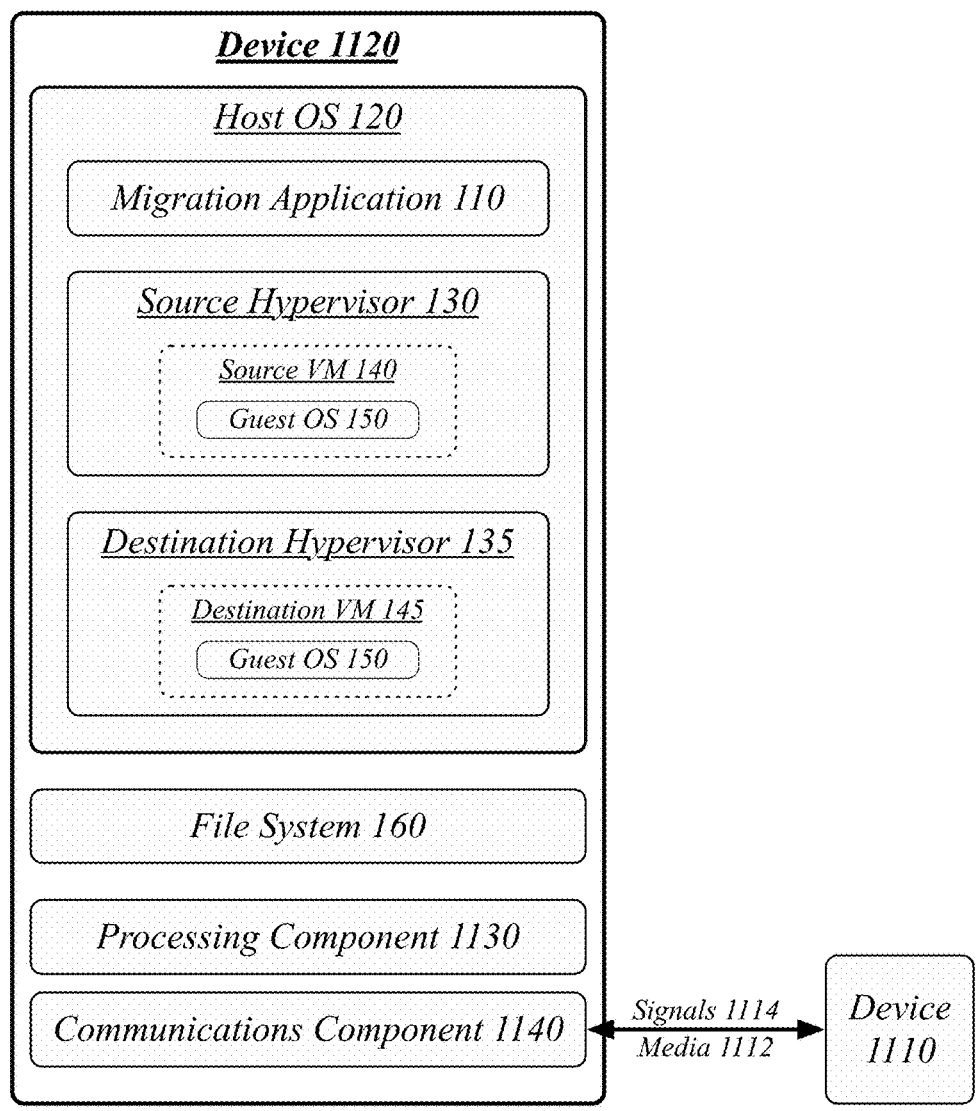
FIG. 11 illustrates an embodiment of a centralized system for the virtual machine migration system of FIG. 1.

FIG. 11 illustrates a block diagram of a centralized system 1100. The centralized system 1100 may implement some or all of the structure and/or operations for the virtual machine migration system 100 in a single computing entity, such as entirely within a single device 1120.

The device 1120 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the system 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1120 may execute communications operations or logic for the system 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with a device 1110 over a communications media 1112 using communications signals 1114 via the communications component 1140. The device 1110 may be internal or external to the device 1120 as desired for a given implementation.

The device 1120 may host the host OS 120, the host 120 running the migration application 110, source hypervisor 130, and destination hypervisor 135, with the source VM 140 and destination VM 145 provided by the respective hypervisors 130, 135. The device 1120 may also host the file system 160 storing the virtual disk blocks 190 for the source VM virtual disk 170 and destination VM virtual disk 175. The migration application 110 may perform the migration of the guest OS 150 from the source VM 140 to the destination VM 145 on the device 1120.

The device 1110 may provide support or control for the migration operations of the migration application 110 and/or the hosting operations of the device 1120 and host 120. The device 1110 may comprise an external device externally controlling the device 1120, such as where device 1110 is a server device hosting the guest OS 150 and the device 1110 is a client administrator device used to administrate device 1110 and initiate the migration using migration application 110. In some of these cases, the migration application 110 may instead be hosted on the device 1110 with the remainder of the virtual machine migration system 100 hosted on the device 1120. Alternatively, the device 1110 may have hosted the migration application 110 as a distribution repository, with the migration application 110 downloaded to the device 1120 from the device 1110.

Figure 12:
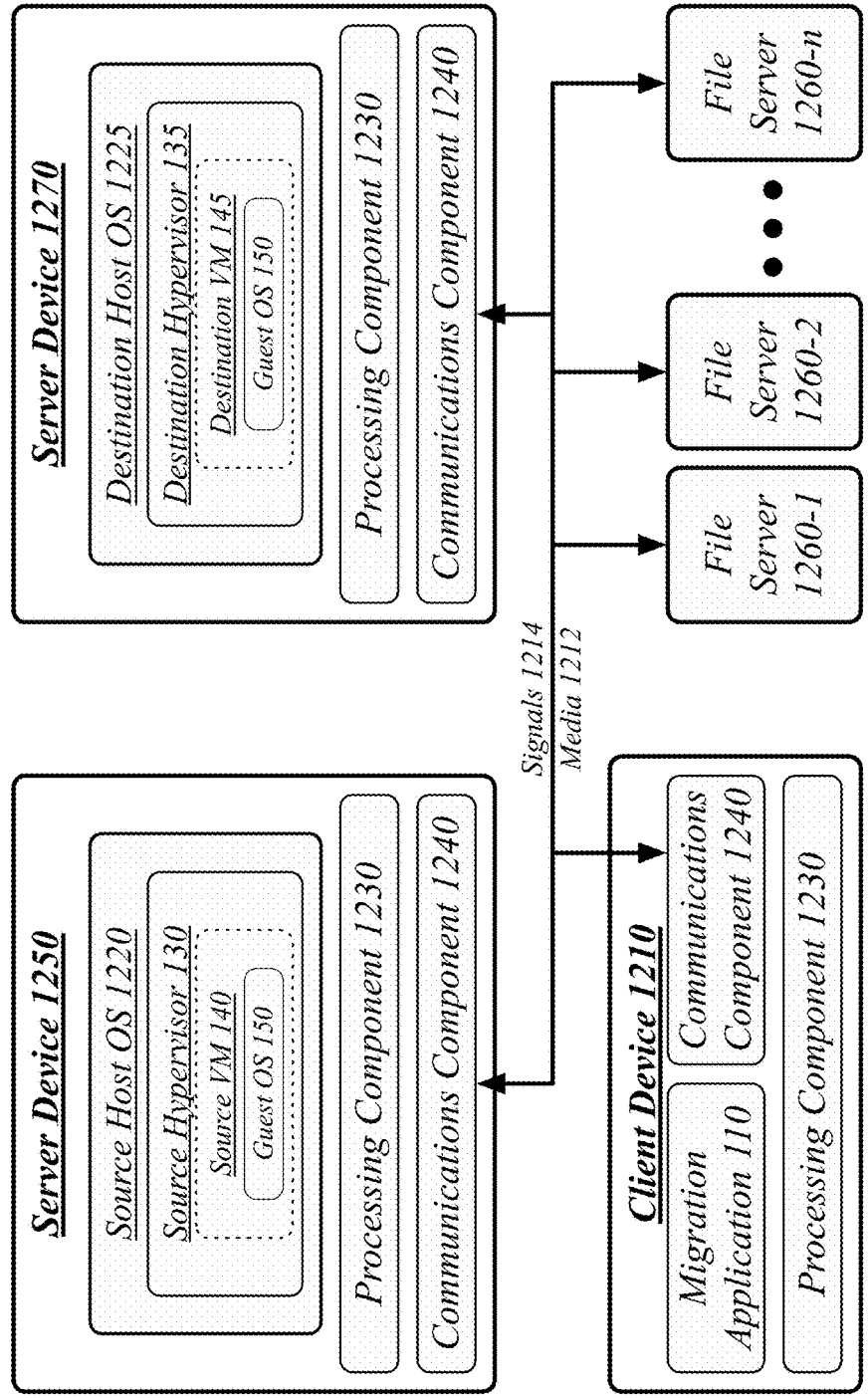
FIG. 12 illustrates an embodiment of a distributed system for the virtual machine migration system of FIG. 1.

FIG. 12 illustrates a block diagram of a distributed system 1200. The distributed system 1200 may distribute portions of the structure and/or operations for the virtual machine migration system 100 across multiple computing entities. Examples of distributed system 1200 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a client device 1210 and server devices 1250 and 1270. In general, the client device 1210 and the server devices 1250 and 1270 may be the same or similar to the client device 1120 as described with reference to FIG. 11. For instance, the client device 1210 and the server devices 1250 and 1270 may each comprise a processing component 1230 and a communications component 1240 which are the same or similar to the processing component 1130 and the communications component 1140, respectively, as described with reference to FIG. 11. In another example, the devices 1210, 1250, and 1270 may communicate over a communications media 1212 using communications signals 1214 via the communications components 1240. The distributed system 1200 may comprise a distributed file system implemented by distributed file servers 1260 including file servers 1260-1 through 1260-n, where the value of n may vary in different embodiments and implementations. The local storage of the client device 1210 and server devices 1250, 1270 may work in conjunction with the file servers 1260 in the operation of the distributed file system, such as by providing a local cache for the distributed file system primarily hosted on the file servers 1260 so as to reduce latency and network bandwidth usage for the client device 1210 and server devices 1250, 1270.

The client device 1210 may comprise or employ one or more client programs that operate to perform various methodologies in accordance with the described embodiments. In one embodiment, for example, the client device 1210 may implement the migration application 110 initiating, managing, and monitoring the migration of the guest OS 150 from the source VM 140 to the destination VM 145. The client device 1210 may use signals 1214 to interact with the source hypervisor 130, destination hypervisor 135 and/or guest OS 150 while they are running on each of the source VM 140 and destination VM 145, and file servers 1260.

The server devices 1250, 1270 may comprise or employ one or more server programs that operate to perform various methodologies in accordance with the described embodiments. In one embodiment, for example, the server device 1250 may implement a source host OS 1220 hosting the source hypervisor 130 providing the source VM 140. The server device 1250 may use signals 1214 to receive control signals from the migration application 110 on client device 1210 and to transmit configuration and status information to the migration application 110. The server device 1250 may use signals 1214 communicate with the file servers 1260 both for the providing of source VM 140 and for the migration of guest OS 150 from the source VM 140 to the destination VM 145.

The server device 1270 may implement a destination host OS 1225 hosting the destination hypervisor 135 providing the destination VM 145. The server device 1270 may use signals 1214 to receive control signals from the migration application 110 on client device 1210 and to transmit configuration and status information to the migration application 110. The server device 1270 may use signals 1214 communicate with the file servers 1260 both for the providing of destination VM 145 and for the migration of guest OS 150 to the destination VM 145 to the source VM 140.

In some embodiments, the same server device may implement both the source hypervisor 130 and the destination hypervisor 135. In these embodiments, the migration application 110 hosted on a client device 1210 may perform the migration of the guest OS 150 from the source VM 140 to the destination VM 145 on this single server device, in conjunction with migration operations performed using the distributed file system.

Figure 13:
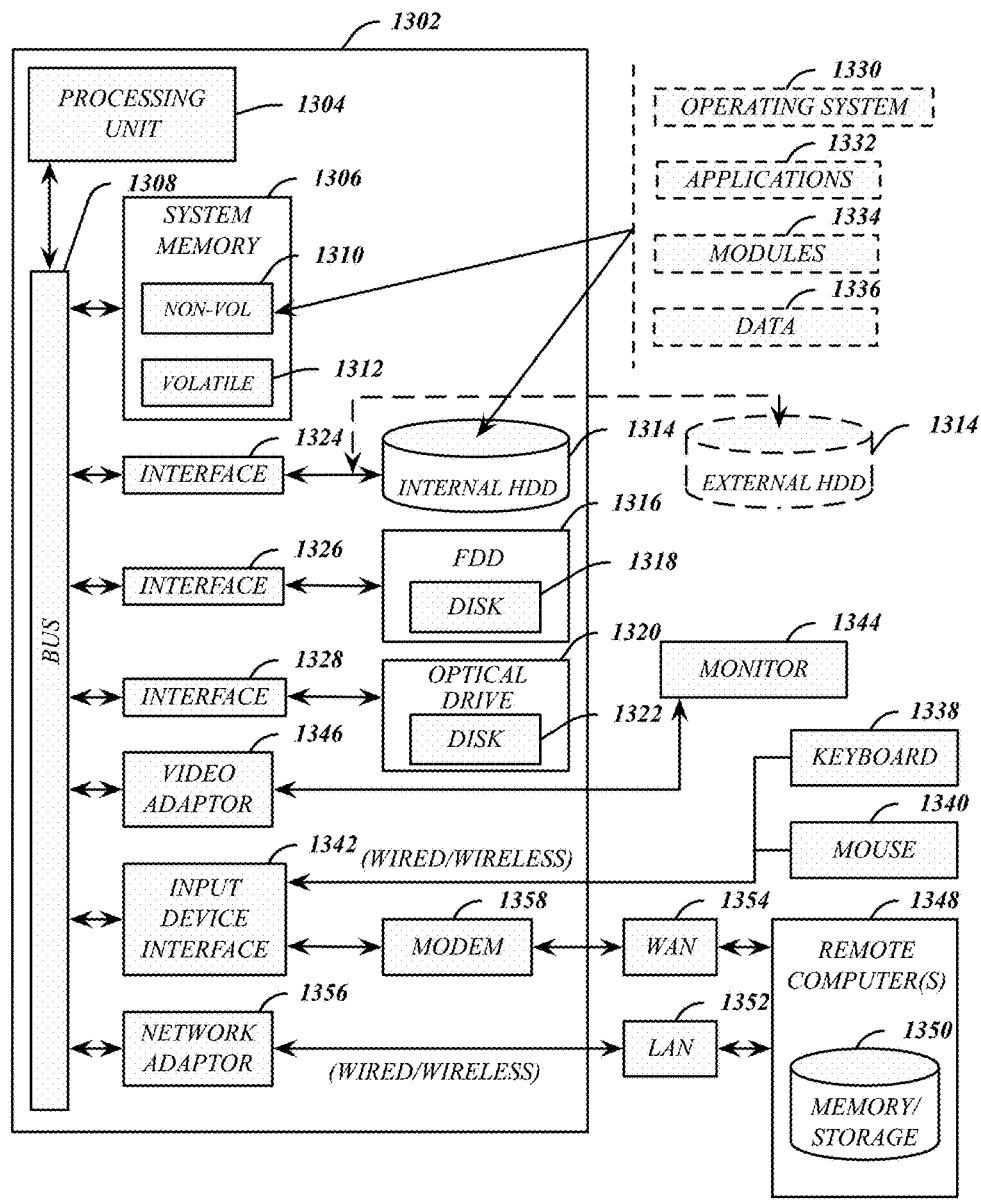
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
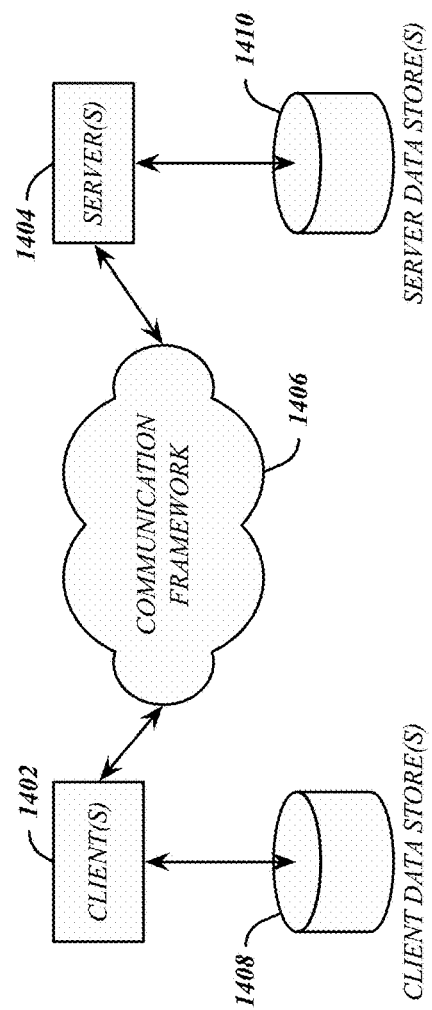
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement the client device 910. The servers 1404 may implement the server device 950. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
retrieving information regarding a source virtual machine provided by a source hypervisor and a destination virtual machine provided by a destination hypervisor;
using the retrieved information to generate a first script for migrating a guest operating system executed at the source virtual machine to the destination virtual machine; wherein the first script is generated by an application using script elements with assignable template variable values for performing a plurality of tasks for migrating the guest operating system;
determining that the source virtual machine is accessible to automated commands;
executing the first script in the guest operating system running on the source virtual machine, the first script collecting configuration information of the guest operating system based on current guest operating system configuration and by querying the guest operating system and configuration files of the guest operating system;
generating a second script by the first script based on the collected configuration information using script elements specific to a source hypervisor type and a destination hypervisor type; and
executing the second script in the guest operating system running on the destination virtual machine, the second script reconfiguring the guest operating system using reconfiguration commands that are encoded by the first script, to run the guest operating system on the destination virtual machine; wherein the source hypervisor and destination hypervisor differ in hardware virtualization as to prevent the guest operating system from making full use of the destination virtual machine without reconfiguration.

2. The method of claim 1, the configuration information collected comprising a mapping between one or more network interfaces of the source virtual machine and media access control addresses assigned to the one or more network interfaces of the source virtual machine, wherein the second script reconfigures the guest operating system by creating associations between the guest operating system and one or more network interfaces of the destination virtual machine based on the mapping.

3. The method of claim 1, the first script executed in the guest operating system using at least one of a remote access application programming interface of the guest operating system or a remote administration application programming interface of a hypervisor for the source virtual machine.

4. The method of claim 1, further comprising:
determining that the source virtual machine is inaccessible to automated commands; and
generating the first script as an offline script operative for human-initiated execution.

5. The method of claim 1, further comprising:
configuring the guest operating system running on the source virtual machine to automatically execute the second script on a next booting up of the guest operating system;
shutting down the guest operating system; and
booting up the guest operating system on the destination virtual machine.

6. The method of claim 1, wherein the application uses power cycling of the source virtual machine and the destination virtual machine for monitoring progress of the first script and the second script, without having to install agents within the guest operating systems.

7. The method of claim 1, wherein the second script is generated using script elements specific to a source virtual machine type and a destination virtual machine type.

8. An apparatus, comprising: a processor circuit on a device;
a script generation component operative on the processor circuit to generate a first script, the first script to migrate a guest operating system running on a source virtual machine to run on a destination virtual machine; wherein information regarding the source virtual machine provided by a source hypervisor and the destination virtual machine provided by a destination hypervisor is retrieved and the script generation component uses the retrieved information to generate the first script with assignable template variable values for performing a plurality of tasks for migrating the guest operating system;
the first script operative to collect configuration information of the guest operating system by querying the guest operating system and configuration files of the guest operating system, generate a second script based on the collected configuration information using script elements specific to a source hypervisor type and a destination hypervisor type, and configure the guest operating system to execute the second script, the configuration information collected while the guest operating system is running on the source virtual machine, the guest operating system configured for the execution of the second script to occur while the guest operating system is running on the destination virtual machine using reconfiguration commands that are encoded by the first script; wherein the source hypervisor and destination hypervisor differ in hardware virtualization as to prevent the guest operating system from making full use of the destination virtual machine without reconfiguration.

9. The apparatus of claim 8, the configuration information collected comprising a mapping between one or more network interfaces of the source virtual machine and media access control addresses assigned to the one or more network interfaces of the source virtual machine, wherein the second script reconfigures the guest operating system by creating associations between the guest operating system and one or more network interfaces of the destination virtual machine based on the mapping.

10. The apparatus of claim 8, further comprising:
a remote access component operative on the processor circuit to command the guest operating system to execute the first script using at least one of a remote access application programming interface of the guest operating system or a remote administration application programming interface of the source hypervisor for the source virtual machine.

11. The apparatus of claim 8, further comprising:
a remote access component operative on the processor circuit to determine that the source virtual machine is inaccessible to automated commands; and
the script generation component operative to generate the first script as an offline script operative for human-initiated execution based on the remote access component determining that the source virtual machine is inaccessible to automated commands.

12. The apparatus of claim 8, further comprising:
the first script operative to configure the guest operating system running on the source virtual machine to automatically execute the second script on a next booting up of the guest operating system and shut down the guest operating system;
the remote access component operative on the processor circuit to command a hypervisor to boot up the guest operating system on the destination virtual machine.

13. The apparatus of claim 8, wherein power cycling of the source virtual machine and the destination virtual machine is used for monitoring progress of the first script and the second script, without having to install agents within the guest operating systems.

14. At least one non-transitory computer-readable storage medium comprising instructions that, when executed, cause a system to:
retrieve information regarding a source virtual machine provided by a source hypervisor and a destination virtual machine provided by a destination hypervisor;
use the retrieved information to generate a first script for migrating a guest operating system executed at the source virtual machine to the destination virtual machine; wherein the first script is generated by an application using script elements with assignable template variable values for performing a plurality of tasks for migrating the guest operating system;
determine that the source virtual machine is accessible to automated commands;
execute the first script in the guest operating system running on the source virtual machine, the first script collecting configuration information of the guest operating system based on current guest operating system configuration and by querying the guest operating system and configuration files of the guest operating system and generating a second script based on the collected configuration information using script elements specific to a source hypervisor type and a destination hypervisor type; and execute the second script in the guest operating system running on the destination virtual machine, the second script reconfiguring the guest operating system using reconfiguration commands that are encoded by the first script to run the guest operating system on the destination virtual machine; wherein the source hypervisor and destination hypervisor differ in hardware virtualization as to prevent the guest operating system from making full use of the destination virtual machine without reconfiguration.

15. The computer-readable storage medium of claim 14, the configuration information collected comprising a mapping between one or more network interfaces of the source virtual machine and media access control addresses assigned to the one or more network interfaces of the source virtual machine, wherein the second script reconfigures the guest operating system by creating associations between the guest operating system and one or more network interfaces of the destination virtual machine based on the mapping.

16. The computer-readable storage medium of claim 14, the first script executed in the guest operating system using at least one of a remote access application programming interface of the guest operating system or a remote administration application programming interface of a hypervisor for the source virtual machine.

17. The computer-readable storage medium of claim 14, comprising further instructions that, when executed, cause a system to:

determine that the source virtual machine is inaccessible to automated commands; and generate the first script as an offline script operative for human-initiated execution.

18. The computer-readable storage medium of claim 14, comprising further instructions that, when executed, cause a system to:

configure the guest operating system running on the source virtual machine to automatically execute the second script on a next booting up of the guest operating system;

shut down the guest operating system; and boot up the guest operating system on the destination virtual machine.

19. The computer-readable storage medium of claim 14, wherein the application uses power cycling of the source virtual machine and the destination virtual machine for monitoring progress of the first script and the second script, without having to install agents within the guest operating systems.

20. The computer-readable storage medium of claim 14, wherein the second script is generated using script elements specific to a source virtual machine type and a destination virtual machine type.

21. A computer-implemented method, comprising:

retrieving information regarding a source virtual machine provided by a source hypervisor and a destination virtual machine provided by a destination hypervisor;

using the retrieved information to generate a first script for migrating a guest operating system executed at the source virtual machine to the destination virtual machine; wherein the first script is generated by an application using script elements with assignable template variable values for performing a plurality of tasks for migrating the guest operating system;

determining that the source virtual machine is accessible to automated commands;

executing the first script in the guest operating system running on the source virtual machine, the first script collecting configuration information of the guest operating system based on current guest operating system configuration and by querying the guest operating system and configuration files of the guest operating system;

generating a second script by the first script based on the collected configuration information using script elements specific to a source hypervisor type and a destination hypervisor type; and executing the second script in the guest operating system running on the destination virtual machine, the second script reconfiguring the guest operating system using reconfiguration commands that are encoded by the first script, to run the guest operating system on the destination virtual machine;

wherein the configuration information collected comprising a mapping between one or more network interfaces of the source virtual machine and media access control addresses assigned to the one or more network interfaces of the source virtual machine, wherein the second script reconfigures the guest operating system by creating associations between the guest operating system and one or more network interfaces of the destination virtual machine based on the mapping.

* * * * *